(12) United States Patent
Benson

(10) Patent No.: US 12,215,648 B2
(45) Date of Patent: Feb. 4, 2025

(54) FUEL INJECTION SYSTEM FOR ENHANCED LOW INJECTION QUANTITY CONTROL

(71) Applicant: Cummins Inc., Columbus, IN (US)

(72) Inventor: Donald J. Benson, Columbus, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 18/536,874

(22) Filed: Dec. 12, 2023

(65) Prior Publication Data

US 2024/0200505 A1   Jun. 20, 2024

Related U.S. Application Data

(63) Continuation of application No. PCT/US2022/018474, filed on Mar. 2, 2022.

(60) Provisional application No. 63/216,981, filed on Jun. 30, 2021.

(51) Int. Cl.
*F02D 41/40* (2006.01)
*F02D 41/24* (2006.01)

(52) U.S. Cl.
CPC ......... *F02D 41/40* (2013.01); *F02D 41/2432* (2013.01); *F02D 2200/0602* (2013.01); *F02D 2200/0614* (2013.01)

(58) Field of Classification Search
CPC .... F02D 41/40; F02D 41/2432; F02D 41/247; F02D 41/403; F02D 2200/0614; F02D 41/3872

See application file for complete search history.

(56) References Cited

U.S. PATENT DOCUMENTS

| | | | |
|---|---|---|---|
| 4,274,380 A * | 6/1981 | de Vulpillieres | F02M 69/14 123/456 |
| 5,299,919 A * | 4/1994 | Paul | F02M 63/0007 417/387 |
| 5,397,055 A * | 3/1995 | Paul | F02M 63/0007 239/533.8 |
| 6,085,142 A | 7/2000 | Di Leo et al. | |
| 7,437,234 B2 | 10/2008 | Halleberg | |
| 7,945,372 B2 | 5/2011 | Geveci et al. | |
| 9,850,872 B2 | 12/2017 | Ruth et al. | |
| 10,385,788 B2 | 8/2019 | Welch et al. | |
| 2006/0090733 A1 | 5/2006 | Fujii | |

(Continued)

OTHER PUBLICATIONS

International Search Report and Written Opinion, PCT Appln. No. PCTUS22018474, filed Mar. 2, 2022, mailed May 18, 2022, 8 pgs.

*Primary Examiner* — John Kwon
(74) *Attorney, Agent, or Firm* — Taft, Stettinius & Hollister LLP

(57) ABSTRACT

Fuel injection control systems and methods for enhancing the delivery of low quantities of fuel in internal combustion engines. Calibration/control data may be continuously generated and updated during the operation of the engine, for example without delivering fuel to the engine cylinders. Disclosed embodiments include periodically operating one or more fuel injectors of the engine in a non-injection state; generating and storing parameter information representative of the operation of the one or more fuel injectors in the non-injection state; and operating the one or more fuel injectors in an injection state to inject a desired pulse of fuel based upon the parameter information and information representative of an additional amount of fuel.

16 Claims, 35 Drawing Sheets

(56) References Cited

U.S. PATENT DOCUMENTS

| | | |
|---|---|---|
| 2008/0103675 A1 | 5/2008 | Ishizuka et al. |
| 2009/0076707 A1* | 3/2009 | Sugiyama ............. F02D 41/123 |
| | | 701/103 |
| 2009/0158833 A1 | 6/2009 | Kusatsugu |
| 2010/0100303 A1 | 4/2010 | Yuzaki et al. |
| 2012/0234294 A1 | 9/2012 | Nakamura et al. |
| 2012/0240670 A1 | 9/2012 | Takashima |
| 2015/0068496 A1* | 3/2015 | Yudanov ............ F02M 63/0005 |
| | | 123/456 |

* cited by examiner

Eq. 1: $Tql = Tzf + Tcq$

Eq. 2: $Tzf = Ctzf0 + Ctzf1 P + Ctzf2/P$

Eq. 3: $Tql = Tzf + Tcq + \Delta Tlb$

Eq. 4: $Tql = Cql0 + Cql1 P + Cql2/P$

Eq. 5: $Tql = Tzf + Tcq + \Delta Tlb + \Delta Tpcyl$

Eq. 7: $Q_{pv} = C_{Qpv\_adaptive\_0} + C_{Qpv\_adaptive\_1} * P + C_{Qpv\_fixed\_2} * T + C_{Qpv\_adaptive\_3} * P * T$ Eq. 7A: $Q_{pv} = C_{Qpv\_adaptive\_0,r1} + C_{Qpv\_adaptive\_1,r1} * P + C_{Qpv\_fixed\_2,r1} * T + C_{Qpv\_adaptive\_3,r1} * P * T$ Eq. 7B: $Q_{pv} = C_{Qpv\_adaptive\_0,r2} + C_{Qpv\_adaptive\_1,r2} * P + C_{Qpv\_fixed\_2,r2} * T + C_{Qpv\_adaptive\_3,r2} * P * T$ Eq. 7C: $Q_{pv} = C_{Qpv\_adaptive\_0,r3} + C_{Qpv\_adaptive\_1,r3} * P + C_{Qpv\_fixed\_2,r3} * T + C_{Qpv\_adaptive\_3,r3} * P * T$ Eq. 8: $\dfrac{\delta Q_{pv}}{\delta T} = C_{Qpv\_fixed\_2} + C_{Qpv\_adaptive\_3} * P$ Eq. 9: $Tzf\_nominal = Ctzf0\_nominal + Ctzf1\_nominal * P + Ctzf2\_nominal/P$ Eq. 10: $Qpvzf\_nominal = Cqpv\_nominal\_0 + Cqpv\_nominal\_1 * P + Cqpv\_nominal\_2 * P^2$

FIG. 5A

Eq.11: $\dfrac{\delta Q_{pvzf}}{\delta T_{zf}} = \dfrac{Q_{pvzf} - Q_{pvzf\_Nominal}}{T_{zf} - T_{zf\_Nominal}} = C_{dQpvzf/dTz\_0} + C_{dQpvzf/dTz\_1}{}^{P}$ Eq.11A: $\dfrac{\delta Q_{pvzf}}{\delta T_{zf}} = C_{dQpvzf/dTz\_0,r1} + C_{dQpvzf/dTz\_1,r1}{}^{P}$ for P<=1000 bars Eq.11B: $\dfrac{\delta Q_{pvzf}}{\delta T_{zf}} = C_{dQpvzf/dTz\_0,r2} + C_{dQpvzf/dTz\_1,r2}{}^{P}$ for P>1000 bars Eq.12: $T_{zf} = \dfrac{C_{Qpv\_adaptive\_0} + C_{Qpv\_adaptive\_1}{}^{*}P + (C_{dQpvzf/dTzf\_0} + C_{dQpvzf/dTz\_1}{}^{*}P){}^{*}T_{zf\_Nominal} - Q_{pvzf\_Nominal} - C_{Qpv\_fixed\_2} - C_{Qpv\_adaptive\_3}{}^{*}P}{[(C_{dQpvzf/dTzf\_0} + (C_{dQpvzf/dTz\_1}{}^{P}){}^{*}T_{zf\_Nominal} - Q_{pvzf\_Nominal}]{}^{*}(C_{Qpv\_fixed\_2} + C_{Qpv\_adaptive\_3}{}^{P}) + (C_{dQpvzf/dTz\_1}{}^{P})}$
$+ (C_{Qpv\_adaptive\_1}{}^{*}P){}^{*}(C_{dQpvzf/dTzf\_0} + (C_{dQpvzf/dTz\_1}{}^{P})$ Eq.13: $Q_{pvzf} = C_{dQpvzf/dTzf\_0} + C_{dQpvzf/dTz\_1}{}^{P} - C_{Qpv\_fixed\_2} - C_{Qpv\_adaptive\_3}{}^{P}$

FIG. 5B

Eq. 14:
$$\begin{Bmatrix} C_{Tzf0} \\ C_{Tzf1} \\ C_{Tzf2} \end{Bmatrix} = \begin{bmatrix} N & \sum_{i=1}^{N} P_v & \sum_{i=1}^{N}\left(\frac{1}{P_v}\right) \\ \sum_{i=1}^{N} P_v & \sum_{i=1}^{N} P_v^2 & N \\ \sum_{i=1}^{N}\left(\frac{1}{P_v}\right) & N & \sum_{i=1}^{N}\left(\frac{1}{P_v}\right)^2 \end{bmatrix}^{-1} \begin{Bmatrix} \sum_{i=1}^{N} T_{ZF} \\ \sum_{i=1}^{N}(T_{ZF}*P_v) \\ \sum_{i=1}^{N}\left(\frac{T_{ZF}}{P_v}\right) \end{Bmatrix}$$

Eq. 15:
$$\begin{bmatrix} i_{11} & i_{12} & i_{13} \\ i_{12} & i_{22} & i_{23} \\ i_{13} & i_{23} & i_{33} \end{bmatrix} = \begin{bmatrix} N & \sum_{i=1}^{N} P_v & \sum_{i=1}^{N}\left(\frac{1}{P_v}\right) \\ \sum_{i=1}^{N} P_v & \sum_{i=1}^{N} P_v^2 & N \\ \sum_{i=1}^{N}\left(\frac{1}{P_v}\right) & N & \sum_{i=1}^{N}\left(\frac{1}{P_v}\right)^2 \end{bmatrix}^{-1}$$

FIG. 5B (Continued)

Eq. 16A: $C_{TZf0} = i_{11} * \sum_{i=1}^{N} T_{ZF} + i_{12} * \sum_{i=1}^{N} (T_{ZF} * P_V) + i_{13} * \sum_{i=1}^{N} \left(\frac{T_{ZF}}{P_V}\right)$ Eq. 16B: $C_{Tzf1} = i_{12} * \sum_{i=1}^{N} T_{ZF} + i_{22} * \sum_{i=1}^{N} (T_{ZF} * P_V) + i_{23} * \sum_{i=1}^{N} \left(\frac{T_{ZF}}{P_V}\right)$ Eq. 16C: $C_{Tzf2} = i_{13} * \sum_{i=1}^{N} T_{ZF} + i_{23} * \sum_{i=1}^{N} (T_{ZF} * P_V) + i_{33} * \sum_{i=1}^{N} \left(\frac{T_{ZF}}{P_V}\right)$ Eq. 17: $\Delta Tbf\_nominal = Tbf\_nominal - Tzf\_nominal$ Eq. 18: $\Delta Tbf\_individual = Tbf\_individual - Tzf\_individual$ Eq. 19: $\Delta Tb = \Delta Tbf\_individual - \Delta Tbf\_nominal$ Eq. 20: $\Delta Tlb + Clb * \Delta Tb$ Eq. 21: $Clb = \Delta Tlb / \Delta Tb$ Eq. 22: $\begin{Bmatrix} C_{UL0} \\ C_{UL1} \\ C_{UL2} \end{Bmatrix} = \begin{bmatrix} N & \sum_{i=1}^{N} P_V & \sum_{i=1}^{N}\left(\frac{1}{P_V}\right) \\ \sum_{i=1}^{N} P_V & \sum_{i=1}^{N} P_V^2 & N \\ \sum_{i=1}^{N}\left(\frac{1}{P_V}\right) & N & \sum_{i=1}^{N}\left(\frac{1}{P_V}\right)^2 \end{bmatrix}^{-1} \begin{Bmatrix} \sum_{i=1}^{N} T_{UL} \\ \sum_{i=1}^{N}(T_{UL} * P_V) \\ \sum_{i=1}^{N}\left(\frac{T_{UL}}{P_V}\right) \end{Bmatrix}$

FIG. 5C

Eq. 23: $\begin{bmatrix} u_{11} & u_{12} & u_{13} \\ u_{12} & u_{22} & u_{23} \\ u_{13} & u_{23} & u_{33} \end{bmatrix} = \begin{bmatrix} N & \sum_{i=1}^{N} P_v & \sum_{i=1}^{N}\left(\frac{1}{P_v}\right) \\ \sum_{i=1}^{N} P_v & \sum_{i=1}^{N} P_v^2 & N \\ \sum_{i=1}^{N}\left(\frac{1}{P_v}\right) & N & \sum_{i=1}^{N}\left(\frac{1}{P_v}\right)^2 \end{bmatrix}^{-1}$ Eq. 24A: $C_{UL0} = u_{11} * \sum_{i=1}^{N} T_{UL} + u_{12} * \sum_{i=1}^{N}(T_{UL} * P_v) + u_{13} * \sum_{i=1}^{N}\left(\frac{T_{UL}}{P_v}\right)$ Eq. 24B: $C_{UL1} = u_{12} * \sum_{i=1}^{N} T_{UL} + u_{22} * \sum_{i=1}^{N}(T_{UL} * P_v) + u_{23} * \sum_{i=1}^{N}\left(\frac{T_{UL}}{P_v}\right)$ Eq. 24C: $C_{UL2} = u_{13} * \sum_{i=1}^{N} T_{UL} + u_{23} * \sum_{i=1}^{N}(T_{UL} * P_v) + u_{33} * \sum_{i=1}^{N}\left(\frac{T_{UL}}{P_v}\right)$ Eq. 25: $\Delta T_{pcyl} / \Delta P_{pcyl} = C_{cyl0} + C_{cyl1} * P + C_{cyl2}/P + C_{cyl3} * Q + C_{cyl4} * Q/P$

FIG. 5D

FUEL INJECTION SYSTEM FOR ENHANCED LOW INJECTION QUANTITY CONTROL

This application is a continuation of International Application No. PCT/US2022/018474 filed Mar. 2, 2022 which claims priority to U.S. Provisional Application No. 63/216,981, filed on Jun. 30, 2021, which are hereby incorporated by reference.

FIELD

This disclosure relates generally to fuel injection systems for internal combustion engines. In particular, this disclosure relates to control of relatively low quantities of injected fuel by fuel injection systems.

BACKGROUND

Fuel injected internal combustion engines include injectors coupled to a pressurized source of fuel for delivering the fuel into the engine cylinders. The injectors are controlled by a control system which actuates and causes the injectors to deliver the desired amounts of fuel at desired times. Each injection event by which a commanded quantity of fuel is delivered to an engine cylinder for ignition may be the result of a plurality of discrete or separate injection pulses over a period of time (i.e., the quantity of fuel provided during the injection event is the sum of the quantities of the injection pulses associated with the injection event). The injection pulses may contain relatively small quantities of fuel. As non-limited examples, a relatively smaller engine may be controlled to produce injection pulse fuel quantities less than about 5 mg, and a relatively larger engines may be controlled to produce injection pulse fuel quantities less than about 15 mg.

Fuel injectors are typically tested and characterized prior to installation into an engine. Parameters defining the performance characteristics of each fuel injector may be stored as calibration data in connection with the control system. One such parameter is the relationship between the injector's controlled on time and the amount of fuel delivered by the injector. However, the performance characteristics of fuel injectors may change over time. Originally programmed calibration data may change over time.

There remains a continuing need for improved fuel injection control systems and methods. In particular, there is a need for control systems and methods capable of adapting to varying performance characteristics of fuel injectors. Control systems and methods capable of enhancing the control of low quantity fuel injection pulses would be especially desirable.

SUMMARY

Disclosed embodiments include fuel injection control systems and methods for enhancing the delivery of fuel, and in particular low quantities of fuel, in an internal combustion engine. The system and method are dynamic in that calibration data used by the system can be continuously generated and updated during the operation of the engine. Particular advantages result from the ability of the system and method to generate calibration data without delivering fuel to the engine cylinders.

Examples include a method for operating a fuel-injected engine, comprising: periodically operating one or more fuel injectors of the engine in a non-injection state; generating and storing parameter information representative of the operation of the one or more fuel Injectors in the non-injection state; operating the one or more fuel injectors in an injection state to inject a desired pulse of fuel based upon the parameter information and information representative of an additional amount of fuel.

In embodiments: operating the one or more fuel injectors in the non-injection state includes periodically operating the injectors at a plurality of rail pressures; generating and storing the parameter information includes generating and storing the parameter information at each of the plurality of rail pressures; and operating the one or more fuel injectors in the injection state includes causing the injector to inject the desired pulse of fuel based upon the parameter information and rail pressure.

In any or all of the above embodiments, generating and storing parameter information includes generating and storing information representative of pilot fuel flow in a non-operational or non-injection. Generating and storing parameter information may include generating and storing information representative of a threshold on time when the fuel injector transitions from the non-injection state to the injection state; and operating the one or more fuel injectors in the injection state may include causing the injector to inject the desired pulse of fuel based upon the threshold on time. Operating the one or more fuel injectors in the injection state may include causing the fuel injector to inject the desired pulse of fuel based upon the parameter information and stored nominal injector information representative of operation of a nominal fuel injector in a non-injection state.

In embodiments, operating the one or more fuel injectors in the injection state includes causing the fuel injector to inject a desired pulse of fuel based upon the parameter information and stored nominal injector information representative of operation of a nominal fuel injector in a non-injection state. In embodiments, the parameter information is information representative a threshold on time when the fuel injector transitions from the non-injection state to the injection state; and the stored nominal injector information is representative of the nominal injector threshold on time when the nominal injector transitions from the non-injection state to an injection state. In embodiments, generating and storing information representative of the operation in the one or more fuel injectors of the engine in the non-injection state includes generating and storing information representative of a drain flow of the injector in the non-injection state; and the stored nominal injector information includes information representative of a drain flow of the nominal injector in the non-injection state.

In any or all of the above embodiments, the information representative of the additional amount of fuel includes the parameter information. The information representative of the additional amount of fuel includes information representative of operation of the one or more fuel injectors of the engine in the injection state. The information representative of the additional amount of fuel may include information representative of operation of the one or more fuel injectors of the engine in a ballistic region of the injection state. The information representative of the additional amount of fuel may include stored nominal injector information representative of operation of a nominal injector in an injection state. The stored nominal injector information may include information representative of the operation of the nominal injector in a ballistic region of the injection state.

In any or all of the above embodiments, the information representative of the additional amount of time includes information defining a relationship between a nominal injector opening time and an actual opening time of a plurality of a plurality of design of experiment fuel injectors.

In any or all of the above embodiments, the desired pulse of fuel is a relatively low quantity pulse of fuel, optionally a quantity within a ballistic opening region of the fuel injector, or optionally within a lower one-half of the ballistic opening region of the fuel injector.

In any or all of the above embodiments, generating and storing parameter information includes generating and storing parameter information representative of the operation of the one or more fuel injectors in an injection state at a plurality of cylinder pressures; and operating the one or more fuel injectors to inject a desired pulse of fuel includes causing the injector to inject the desired pulse of fuel based upon the parameter information and cylinder pressure.

Examples include a control system for a fuel injected engine including one or more fuel injectors, comprising: memory storing data defining: nominal pilot information representative of threshold on times and associated pilot drain flows at a plurality of rail pressures of a nominal fuel injector, wherein the nominal fuel injector corresponds to the one or more fuel injectors of the engine and the threshold on time is representative of a time at which the nominal injector transitions between a non-injection state and an injection state at the associated rail pressure; threshold on time information for the one or more fuel injectors; and nominal delta on time information representative of a plurality of desired low fuel quantities and based on the plurality of rail pressures; an input receiving: rail pressure; and commands for low fuel quantity injection pulses, wherein the low fuel quantities are optionally quantities within a ballistic range of the one or more fuel injectors, or optionally within a lower one-half of the ballistic range of the one or more fuel injectors; one of more processors configured to: periodically operate the one or more fuel injectors of the engine in non-injection state events at a plurality of on times and at a plurality of rail pressures; determining drain flows of the one or more fuel injectors in response to the non-injection state events; determine and store the threshold on time information for the one or more fuel injectors based upon the determined drain flows and the nominal pilot information in response to the non-injection state events, wherein the threshold on time information is representative of an on time of the injector to transition from the non-injection state to an injection state at the plurality of rail pressures; and in response to the commands for the low fuel quantity injection pulses, generate control signals representative of the low fuel quantity injection pulses based upon the stored threshold on time information, the stored nominal delta on time information, and the rail pressure.

In embodiments, the one or more processors are configured to determine and store the threshold on time information for the one or more fuel injectors as individual threshold on times at individual rail pressures by: generating and storing in the memory one or more adaptive drain flow coefficients defining the determined drain flow during the non-injection state events based upon the associated on time and rail pressure; generating and storing in the memory one or more adaptive delta drain flow coefficients defining changes in the drain flow at the threshold on time with respect to changes in the threshold on time; and generating and storing in the memory the individual threshold on times based upon the one or more adaptive drain flow coefficients, the one or more adaptive delta drain flow coefficients, the nominal pilot information, and the rail pressure.

In embodiments, the one or more processors are configured to determine and store the threshold on time information for the one or more fuel injectors by generating and storing curvefit coefficients defining a continuous relationship between the threshold on times and rail pressures based on the individual threshold on times.

In any or all of the above embodiments, the one or more processors are configured to: determine and store in the memory for the one or more fuel injectors injector ballistic region fueling information, including: periodically operating the one or more fuel injectors of the engine in a ballistic region during injection state events at a plurality of on times and at a plurality of rail pressures; determining and storing information representative of the injected fuel pulse quantities and associated on times and rail pressures in response to the injection state events; and in response to the commands for the low fuel quantity injection pulses: generate an injector delta on time based on the injector ballistic region fueling information; and generate the control signals representative of the low fuel quantity injection pulses based upon the stored threshold on time information, the stored nominal delta on time information, injector delta on and the rail pressure. In embodiments, the memory stores data defining: nominal injector ballistic region fueling information; and the one or more processors are configured to; determine the injector delta on time based on the nominal injector ballistic region fueling information and the injector ballistic region fueling information. In embodiments, the memory stores data defining: nominal delta opening velocity calibration information defining a relationship between a nominal opening time and an actual opening time of a plurality of design or experiments fuel injectors at a plurality of rail pressures and desired low fueling quantities; and the one or more processors are configured to: determine the injector delta on time based upon the nominal injector ballasting region fueling information, the injector ballistic region fueling information, and the nominal delta opening velocity calibration information. In embodiments, the one or more processors are configured to determine and store curvefit coefficients defining a continuous relationship between on times for the low quantity fuel injection pulses and rail pressure based on the stored threshold on time information, the stored nominal delta on time information and the stored injector delta on time.

BRIEF DESCRIPTION OF THE DRAWINGS

FIGS. 5A-5D list equations that can be used by a control system in accordance with embodiments.

DETAILED DESCRIPTION

Fuel Injected Engine

Figure 1:
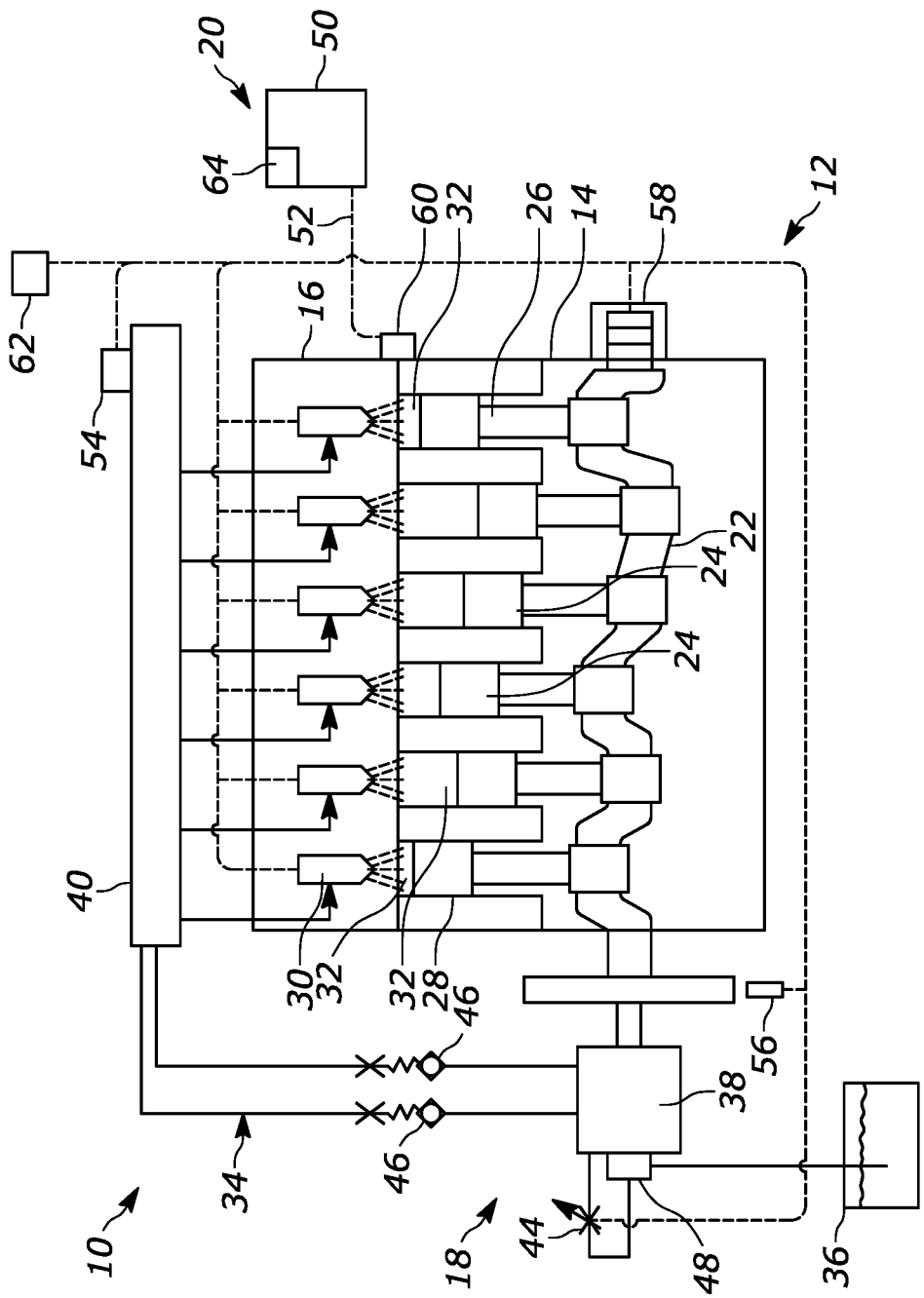
FIG. 1 is a diagrammatic illustration of a fuel injected engine system that can be operated in accordance with embodiments.

FIG. 1 is a diagrammatic illustration of an exemplary engine system including a fuel injected internal combustion engine 10 that can be operated in accordance with embodiments. As shown, the engine 10 includes an engine body 12, which includes an engine block 14 and a cylinder head 16 attached to engine block 14, and a fuel system 18. The engine system includes a control system 20. Control system 20 receives signals from sensors located on engine 10 and transmits control signals to devices located on engine 10 to control the function of those devices, such as one or more fuel injectors 30. As described in greater detail below, control system 20 can be configured to generate injection pulse control signals that operate or control the fuel injectors 30 during fuel injection states to deliver accurate and relatively low quantities or amounts of fuel to the engine 10. Control system 20 can operate or control the engine 10, and in particular the fuel injectors 30, during non-injection states to determine control information used by the control system to generate the low fuel quantity injection pulse control signals.

Engine body 12 includes a crankshaft 22, a plurality of pistons 24, and a plurality of connecting rods 26. Pistons 24 are positioned for reciprocal movement in a plurality of engine cylinders 28, with one piston positioned in each engine cylinder 28. One connecting rod 26 connects each piston 24 to crankshaft 22. The movement of pistons 24 under the action of a combustion process in engine 10 causes connecting rods 26 to move crankshaft 22.

The plurality of fuel injectors 30 are positioned within cylinder head 16. Each fuel injector 30 is fluidly connected to a combustion chamber 32, each of which is defined by a piston 24, cylinder head 16, and the portion of engine cylinder 28 that extends between a respective piston 24 and cylinder head 16.

Fuel system 18 provides fuel to injectors 30, which is then injected into combustion chambers 32 by the action of fuel injectors 30, forming one or more injection pulse events. Fuel system 18 includes a fuel circuit 34, a fuel tank 36, which contains a fuel, a high-pressure fuel pump 38 positioned along fuel circuit 34 downstream from fuel tank 36, and the fuel rail or accumulator 40 positioned along fuel circuit 34 downstream from high-pressure fuel pump 38. While fuel rail or accumulator 40 is shown as a single unit or element, accumulator 40 may be distributed over a plurality of elements that transmit or receive high-pressure fuel, such as fuel injector(s) 30, high-pressure fuel pump 38, and any lines, passages, tubes, hoses, conduits, and the like that couple high-pressure fuel to the plurality of elements. Fuel system 18 may further include an inlet metering valve 44, positioned along fuel circuit 34 upstream from high-pressure fuel pump 38, and one or more outlet check valves 46, positioned along fuel circuit 34 downstream from high-pressure fuel pump 38 to permit one-way fuel flow from high-pressure fuel pump 38 to fuel accumulator 40. Although not shown, embodiments may include additional elements positioned along fuel circuit 34. For example, inlet check valves may be positioned downstream from inlet metering valve 44 and upstream from high-pressure fuel pump 38, or inlet check valves may be incorporated in high-pressure fuel pump 38. Inlet metering valve 44 has the ability to vary or shut off fuel flow to high-pressure fuel pump 38, which thus shuts off fuel flow to fuel accumulator 40. Fuel circuit 34 connects fuel accumulator 40 to fuel injectors 30, which receive the pressurized fuel from fuel accumulator 40 (e.g., at a rail pressure), and then provide controlled amounts of fuel to combustion chambers 32 during the injection events. Fuel system 18 may also include a low-pressure fuel pump 48 positioned along fuel circuit 34 between fuel tank 36 and high-pressure fuel pump 38. Low-pressure fuel pump 48 increases the fuel pressure to a first pressure level prior to fuel flowing into high-pressure fuel pump 38.

Pressure of the fuel in the fuel rail or accumulator 40 can be measured by an accumulator pressure sensor 54. The actuation of a fuel injector 30 in response to a pulse control signal causes a pressure drop or decrease in the fuel rail or accumulator 40 that is measured by the pressure sensor 54. In embodiments, the amount of fuel delivered into the combustion chamber 32 by the actuation of the fuel injector (e.g., when the fuel injector is operated in an injection state as described below), and/or the amount of fuel otherwise released from the fuel rail or accumulator 40 in response to actuation of the injector (e.g., pilot valve drain flows during a non-injection state actuation as described below) may be measured or indicated based on the pressure drop or decrease in accordance with conventional or otherwise known approaches. Control system 20 is configured to determine these delivered or otherwise released quantities of fuel based on the pressure information provided by the pressure sensor 54. In other embodiments, quantities of fuel delivered to the combustion chamber or otherwise released from the fuel rail or accumulator 40 by actuation of an injector 30 can be determined by other approaches such as for example flow sensors.

Control system 20 may also include an engine temperature sensor 60, an altitude sensor 62, and a crank angle sensor 64. While pressure sensor 54 is described as being a pressure sensor, the sensor may be other devices that may be calibrated or configured to provide a pressure signal that represents the pressure of the fuel being applied to a fuel injector, such as a force transducer, strain gauge, or other device. Engine temperature sensor 60 may be positioned to measure a coolant temperature or may be positioned to measure a temperature of engine body 12, including engine block 14 or cylinder head 16. Altitude sensor 62 may be positioned at any location on engine 10 or in another location, such as a vehicle on which engine 10 is mounted, to measure the altitude at which engine 10 is operating. The crank angle sensor 64 may be a toothed wheel sensor 56, a rotary Hall sensor 58, or other type of device capable of measuring the rotational angle of crankshaft 22. Control system 20 may use signals received from accumulator pressure sensor 54 and the crank angle sensor 64 to determine which combustion chamber 32 contains a piston 24 in position to receive fuel.

Fuel Injectors

Figure 2:
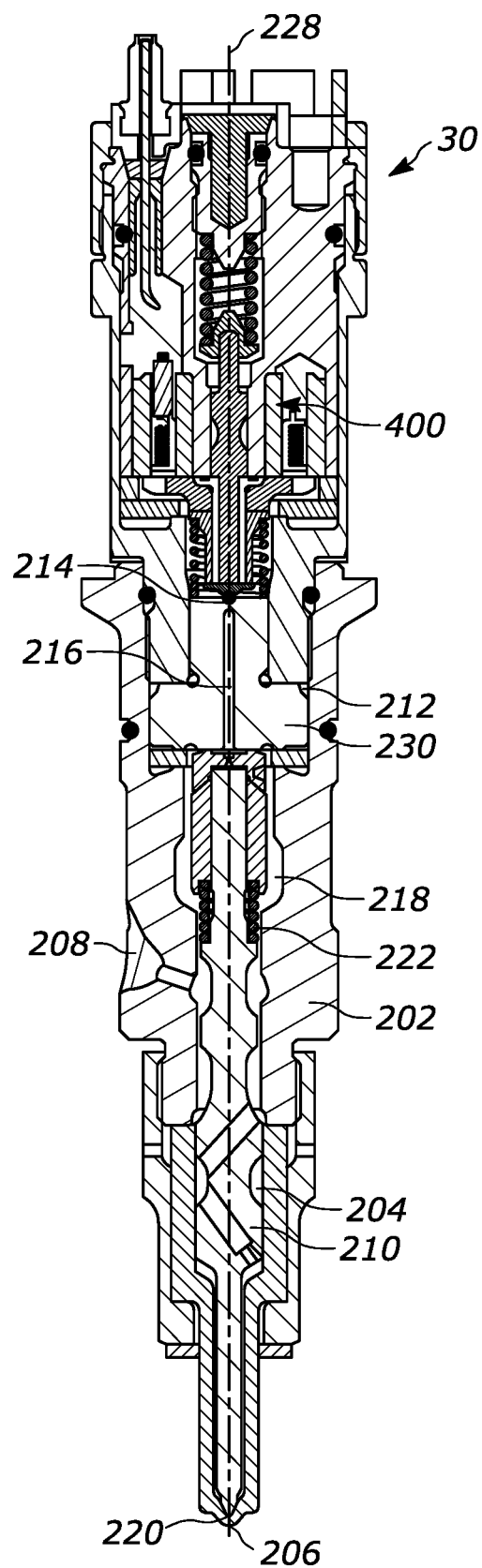
FIG. 2 is a cross sectional illustration of an exemplary fuel injector in accordance with embodiments.
Figure 3:
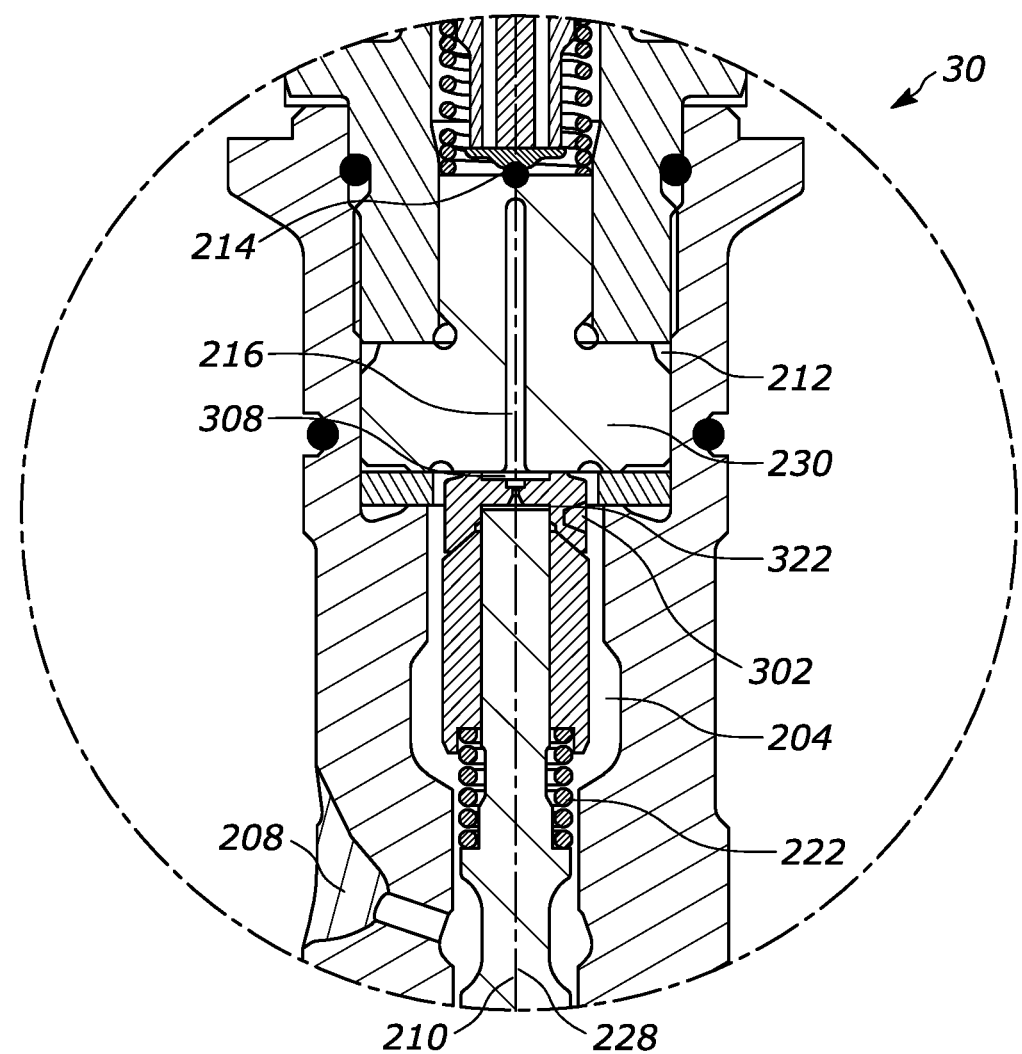
FIG. 3 is a detailed illustration of a portion of the fuel injector shown in FIG. 2.

FIG. 2 is a cross sectional illustration of an exemplary fuel injector 30 in accordance with embodiments. FIG. 3 is a detailed sectional view of the fuel injector 30 shown in FIG. 2. The operation of the fuel injector 30 may be described in connection with FIG. 1. As shown, the fuel injector 30 includes an injector body 202, an injector cavity 204, injector spray holes 206, an inlet conduit 208, a nozzle valve 210, a drain circuit 212, and a pilot valve ball 214. Injector body 202 is generally an elongated cylindrical body which forms injector cavity 204. Injector cavity 204 receives high pressure fuel from a common rail or accumulator 40 of the engine system through inlet conduit 208. The injector body 202 further includes longitudinal axis 228, and injector spray holes 206 in flow communication with the engine combustion chamber 32. Nozzle valve 210 is disposed in injector cavity 204 and moves reciprocally between a closed position (as shown) and an open position (not shown). In the closed position, the nozzle valve 210 sits on a nozzle seat 220 restricting (e.g., preventing) fuel flow from nozzle cavity 204 into combustion chamber 32. In the open position, the nozzle valve 210 moves upward along longitudinal axis 228 such that fuel flows through injector spray holes 206 into combustion chamber 32 (e.g., an injection fuel pulse during injection state operation of the fuel injector). A nozzle spring 222 is positioned in injector cavity 204 so as to permit nozzle spring 222 to bias nozzle valve 210 into the closed position (as shown). The proximal end of nozzle valve 210 is exposed to fuel pressure of a first control chamber 322.

Injector 200 also includes a support 230 which includes a passage 216 extending along longitudinal axis 228 for draining pilot fuel flow into low pressure drain circuit 212. During the non-injection state operation described herein (e.g., when commanded on times are less than a threshold time needed to produce fuel spray into the engine combustion chamber), and during injection state operation, pilot valve drain flow into the drain circuit 212 is produced. When the pilot valve ball 214 is in the open position, passage 216 connects low pressure drain circuit 212 with a high pressure injector circuit. High pressure injector circuit includes passage 216, and injector cavity 204. The opening rate of the nozzle valve 210 may vary between injectors. Drain circuit 212 is in flow communication with the fuel tank 36 through a drain fuel line which may contain a drain pressure control check valve (not shown). An injection control valve 400 may include any conventional pilot value actuator or assembly capable of selectively controlling the movement of pilot valve ball 214, or alternatively or in addition other components that provide the functionality. For example, as shown in FIG. 2, injection control valve 400 may include a conventional solenoid pilot valve actuator, or alternatively, a piezoelectric or magnetostrictive type actuator assembly. For a majority of engine operational time when neither an injection state or a pilot valve drain flow only non-injection state is active, there will be no or substantially no flow or fuel through the pilot valve.

Chamber housing 218 is positioned in the injector cavity 204, between nozzle valve 210 and a support 230, for controlling the movement of nozzle valve 210 between the closed position and the open position and then back to the closed position so as to define an injection pulse events during which fuel flows through injector spray holes 206 into combustion chamber 32 during operation of the injector 30 in the injection state. In the illustrated embodiments, chamber housing 218 has a longitudinal axis parallel with the injector body longitudinal axis 228.

Injector 30 is shown as including a chamber housing 218, an inlet passage 302 and a return port 308. Chamber housing 218 is generally an elongated cylindrical body in the illustrated embodiments. Fuel flows from injector cavity 204 through inlet passage 302. Inlet passage 302 may be a throttled passage having an orifice (not shown). Return port 308 opens at the proximal end of the chamber housing 218 for draining fuel into the drain circuit 212 during operation of the injector 30.

With injection control valve 400 de-actuated, pilot valve ball 214 is in a closed position against support 230, thereby blocking drain flow through channel 216 into drain circuit 212. With the fuel pressure in a first control chamber 322 being same as the fuel pressure in nozzle cavity 204, the fuel pressure forces acting on nozzle valve 210 in combination with the biasing force of nozzle spring 222, keeps the nozzle valve 210 in closed position blocking fuel flow through injector spray holes 206.

In response to injection pulse control signals from the control system 20 having a sufficiently long commanded on time intended to cause a fuel pulse injection event, injection control valve 400 is actuated to controllably move pilot valve ball 214 from the closed position (as shown) to the open position thereby allowing fuel flow from channel 216 to low pressure drain circuit 212. Pressure in the first control chamber 322 decreases as a result of allowing fuel flow from the first control chamber. As the fuel pressure in first control chamber 322 decreases, fuel pressure forces acting on nozzle valve 210 decrease to a level which enables the nozzle valve 210 to move upward against bias force of nozzle spring 222 into the open position, thereby injecting fuel into combustion chamber 32 through nozzle spray holes 206. When the high pressure fuel passes through the nozzle spray holes 206, the high pressure fuel is atomized and diffused, thereby being brought into a state where the fuel is easily mixed with air for combustion.

Upon de-actuation of injection control valve 400, pilot valve ball 214 moves back into the closed position thereby restricting fuel flow to drain circuit 212, which enables an increase in the pressure in the first control chamber 322. Fuel pressure forces acting on nozzle valve 210 along with the biasing force of nozzle spring 222 will begin to move nozzle valve 210 downward along longitudinal axis 228 into the closed position, restricting fuel flow into combustion chamber 32 and ending the injection pulse event. Fuel injector 200 is then ready for next injection pulse event (or non-injection control events as described below).

Figure 4:
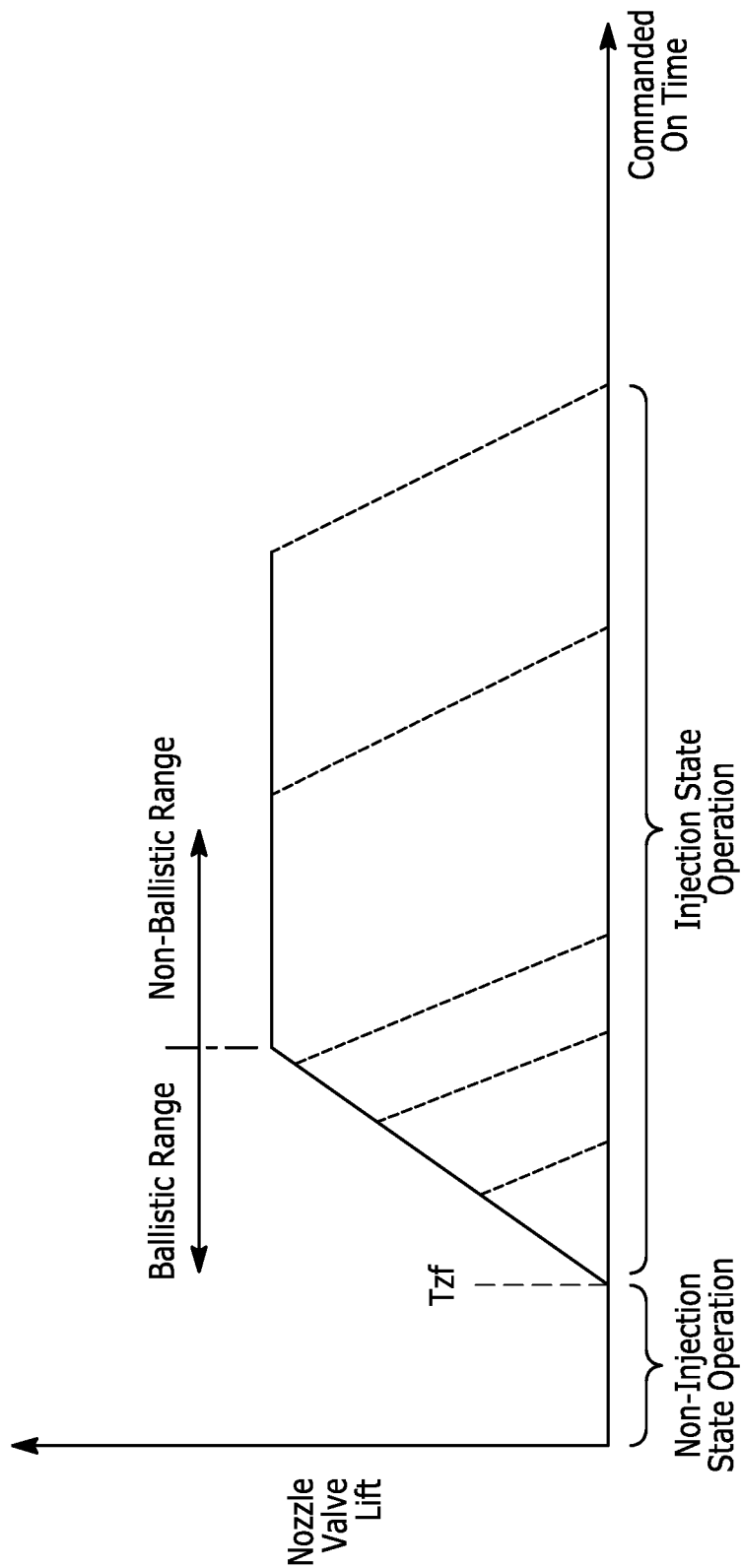
FIG. 4 is a diagrammatic illustration of an exemplary fuel injector nozzle valve lift based on commanded on time.

FIG. 4 is a diagrammatic illustration of the operation of an exemplary injector 30, showing an amount or lift of movement of the nozzle valve 210 with respect to the orifice 206 as a function of control signals representative of commanded on times (t). As shown, in response to relatively short duration commanded on times (e.g., non-injection actuation pulses), the nozzle valve 210 does not lift from the orifice 206, and no lift of the nozzle valve 210 is produced. Control signals that produce non-injection actuation pulses having commanded on times that are sufficiently short to produce no nozzle lift define operation of the injector 30 in a non-injection state. During non-injection state operation, no fuel is delivered into the combustion chamber 32 through the orifice 206 because the nozzle valve 210 remains closed. However, during non-injection state operation of the injector 30, fuel from the rail or accumulator 40 flows into the injector cavity 204, and though the pilot value 214 and return channel 216 into drain circuit 212. The flow of fuel through the fuel injector 30 during non-injection state operation and during injection state operation is referred to as pilot fuel flow. The amount or quantity of pilot fuel flow through the injector 30 in response to an non-injection actuation pulses during non-injection state operation will depend on parameters such as the length of the commanded on time and the pressure of the fuel (e.g., the rail pressure as measured by the pressure sensor 54), and can be determined by the control system 20 in the manners described above. For commanded on times during the non-injection states there is a pilot valve flow and no injected or sprayed flow into the engine cylinders. For commanded on times during injection state operation, there is both pilot valve flow and injected flow.

In response to commanded on times long enough to cause the nozzle valve 210 to move or lift away from the orifice 206, fuel will flow out of the orifice and into the combustion chamber 32. Injection fuel pulses having commanded on times that produce nozzle lift and fuel pulse injection events define operation of the injector 30 in an injection state.

In connection with the description provided herein, a length of a commanded on time corresponding to the time at which the injector 30 transitions from the non-injection state to the injection state is defined as Tzf (e.g., zero flow on time). The mass or amount of fuel that flows through the injector 30 during the Tzf time period (e.g. though the pilot drain circuit 212), which is dependent on the rail or accumulator pressure of the fuel, is defined as Qpzf (e.g., pilot valve drain quantity at zero flow). As described in greater detail below, the methods described herein make use of pilot valve drain flow models of injectors 30, where the drain flow models define corresponding sets or pairs of Tzf and associated Qpzf values at each of a plurality of rail pressures.

As shown in FIG. 4, the amount of nozzle valve lift following the transition from the non-injection state to the injection state (e.g., beginning at time Tzf) increases with increasing commanded on time until the nozzle valve 210 reaches its maximum nozzle lift at a fully open position. Portions of the nozzle lift that occur before the nozzle valve 210 reaches its fully open position may be defined as ballistic range lift during ballistic range injection state operation of the fuel injector 30. Portions of the nozzle lift that occur after the nozzle valve 210 reaches its fully open position may be defined as non-ballistic range lift during non-ballistic state operation of the fuel injector 30. A slope of the nozzle valve lift in the ballistic range can be used to define an opening velocity parameter of the injector 30. For purposes of illustration, FIG. 4 includes several dashed lines, each of which is representative of the decreasing nozzle lift as the nozzle valve 210 moves back toward the orifice 206 to its fully closed position at the end of the associated commanded on time. Slopes of the nozzle lift as the nozzle valve 210 closes can be used to define a closing velocity parameter of the injector 30. The amount of fuel delivered or injected by an injector 30 in response to an injection pulse control signal during injection state operation will depend on parameters including the length of the commanded on time, the pressure of the fuel, the opening velocity parameter, the closing velocity parameter, and the cylinder pressure in the combustion chamber into which the fuel is injected.

Control System Overview

Control system 20 controls one or more of the injectors 30 to cause the injectors to accurately inject or otherwise deliver a wide range of fuel pulse quantities. A particular advantage of the control system 20 is its capability of controlling injectors 30 to cause the injectors to accurately inject or otherwise deliver relatively small quantity fuel pulses, sometimes referred to as ultra-low quantities, such as for example fuel pulses having quantities in the ballistic range of the injection state operation of the injectors 30. As non-limited examples, a relatively smaller engine may be controlled to accurately produce injection pulse fuel quantities less than about 5-7 mg, and a relatively larger engines may be controlled to produce injection pulse fuel quantities less than about 15-20 mg. In embodiments, low quantity fuel pulses may be quantities in the lower one-half of the ballistic range.

As described in greater detail below, these capabilities are based on adapting the control of the injected pulses to specific operating characteristics of the individual injector 30, and may be based on one or more operating conditions of the engine 10. Control system 20 may operate the engine 10 and injectors 30 in parameter data or information collection modes during which the injector-specific and other operating conditions of the engine are collected. The collected parameter information is then processed and used to generate the adaptive control information used to generate the injection pulse control signals during the normal operation of the engine 10. A particular advantage is that the parameter information may be determined from the associated injector by operating the injector in its non-injection state (e.g., when the injector is not being used to inject fuel into the engine during normal operation).

In embodiments, the commanded on time Tql (e.g., low quantity on time) of an injection pulse control signal generated by control system 20 to cause as specific injector 30 to deliver a relatively low quantity of fuel Q1 (e.g., low quantity) can be defined by Eq. 1 in FIG. 5.

Tzf in Eq. 1 is an adapting (e.g., injector-specific) zero flow on time determined for a specific injector 30. (e.g., the length of the non-injection state for the specific injector). Tzf is adapted for the particular operating characteristics of the specific injector. In embodiments, Tzf is also specific for the rail pressure P of the fuel at the time that the associated injection pulse control signal is being generated. Control system 20 operates the engine 10 and fuel injectors 30 in adapting parameter information collection modes to collect adapting parameter information representative of the relationship between discrete or individual Tzf values at each of a plurality of rail pressure P values. In embodiments, Tzf can be determined using a curvefit equation defining Tzf as a continuous function of the rail pressure P and one or more adapting curvefit coefficients based on the individual Tzf values. The curvefit coefficients are injector-specific values representative of operating characteristics of the associated injector 30. As noted above, the injector-specific adapting parameter information used to generate the curvefit coefficients is generated by the control system 20 while the engine is operating, such as by operating the associated injector 30 in non-injection states, and may be periodically updated to reflect the then-current operating characteristics of the injector. In embodiments of these types the curvefit coefficients are also periodically updated based on the updated injector-specific information to enable the control system 20 to calculate then-current values of Tzf. Eq. 2 in FIG. 5, for example, is a curvefit equation defining Tzf as a function of adapting and injector-specific curvefit coefficients Ctzf0, Ctzf1, Ctzf2 and rail pressure P.

Tcq (commanded quantity time) is a non-adapting and nominal delta on time in embodiments, defining an additional on time period that a nominal injector of a type corresponding to the injector 30 (e.g. and "average" injector) should be actuated after its zero flow on time Tzf to deliver a desired commanded quantity of fuel Q1 (e.g., the length of the injection state to deliver the desired commanded quantity of fuel). In embodiments, Tcq is also specific for the rail pressure P of the fuel in the rail or accumulator 40 at the time that the associated injection pulse control signal is being generated. In embodiments, Tcq may also be specific for the cylinder pressure of the combustion chamber 32 into which the fuel is being injected at the time that the associated injection pulse control signal is being generated. Tcq values generally increase with increasing desired commanded quantities of fuel, with decreasing rail pressures P, and with decreasing cylinder pressures. Tcq values can be stored in tabular form as discrete or individual values, or may be computed using stored data defining equations representing the Tcq values as continuous functions of rail pressure P and optionally cylinder pressure. As described below, the Tcq values or data defining the values can be obtained for nominal injectors, for example from test rigs, or may be determined from one or more injectors 30 on the engine 10.

In embodiments, the commanded on time Tql of an injection pulse control signal generated by control system 20 to cause a specific injector 30 to deliver a commanded quantity of fuel, such as a low fuel quantity Q1, may be defined by Eq. 3 in FIG. 5. Tzf and Tcq in Eq. 3 may be the same as Tzf and Tcq, respectively, in Eq. 1. ΔTqb (delta time quantity ballistic) in Eq. 3 is an adapting delta on time period determined for the specific injector 30 that defines an adjustment to the Tcq. In embodiments, ΔTqb is an adjustment that compensates for the amount of fuel delivered by the specific injector 30 while the injector is operating in the ballistic range of its injection state. In particular, ΔTqb compensates for differences in the opening rate of the nozzle valve 210 of the specific injector 30 and an opening rate representative of a nozzle valve of the nominal injector characterizing Tcq. ΔTqb is a commanded on time representing an injector-specific additional amount on time of the injector 30 to cause the injector to deliver desired quantities of fuel, such as low quantities of fuel. A sum of the Tcq and the ΔTqb values represent the amount of additional commanded on time, in addition to the zero flow on time Tzf, that will cause the injector 30 to deliver a desired commanded amount of fuel, such as a low quantity of fuel.

During the adaptive parameter information collection modes, the control system 20 operates the engine 10 and injector 30 to collect information that can be used to characterize individual ΔTqb values corresponding to the individual Tzf and rail pressure P sets or pairs described above in connection with Eq. 1. In embodiments, the Tql values defined by Eq. 3 can be determined using a curvefit equation defining Tql as a continuous function of the rail pressure P and one or more adapting curvefit coefficients. Eq. 4 in FIG. 5, for example, is a curvefit equation defining Tql as a function of adapting and injector-specific curvefit coefficients Cql0, Cql1, Cql2 and rail pressure P.

In yet other embodiments the control system 20 controls the commanded on time Tql of an injection pulse control signal to cause a specific injector 30 to deliver a commanded quantity of fuel Q1 using Eq. 5 in FIG. 5. Tzf, Tcq and ΔTqb in Eq. 5 may be the same as Tzf, Tcq and ΔTqb, respectively, in Eq. 3. ΔTpcyl in Eq. 5 is a delta on the time period determined for the specific injector 30 that defines an adjustment to the Tcq based on the cylinder pressure during an injection pulse event. In embodiments, ΔTpcyl is non-adapting, and is an adjustment that compensates for variations in the amount of fuel delivered by the injector 30 based on the cylinder pressure Pcyl in the combustion chamber 32 of the engine 10 at the time that the associated injection pulse control signal is being generated. In embodiments, ΔTpcyl can also be based on the rail pressure P of the desired quantity of fuel to be injected. Eq. 6 in FIG. 5, for example, is an equation defining ΔTpcyl as a function of non-adapting coefficients Ccyl0, Ccyl1, Ccyl2, Ccyl3 and Ccyl4, and the cylinder pressure Pcyl, the quantity of fuel to be injected Q, and the rail pressure P. As described below, the coefficients used to define ΔTpcyl can be obtained for nominal injectors, for example from test rigs, or may be determined from one or more injectors 30 on the engine 10.

Tzf Adapting Parameter Information Collection

Figure 6:
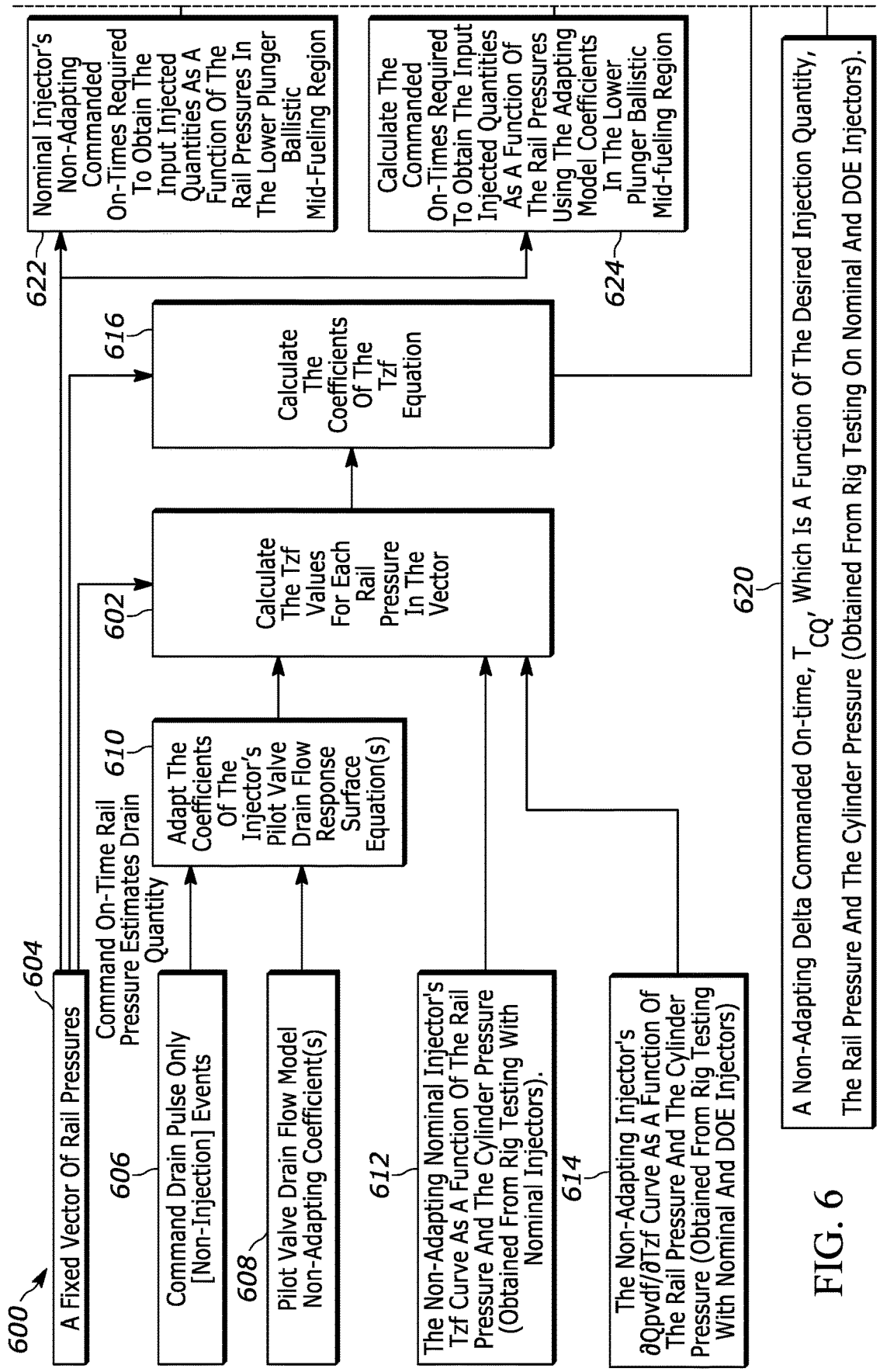
FIG. 6 is a block diagram of a method that can be performed by a control system in accordance with embodiments.
Figure 6:
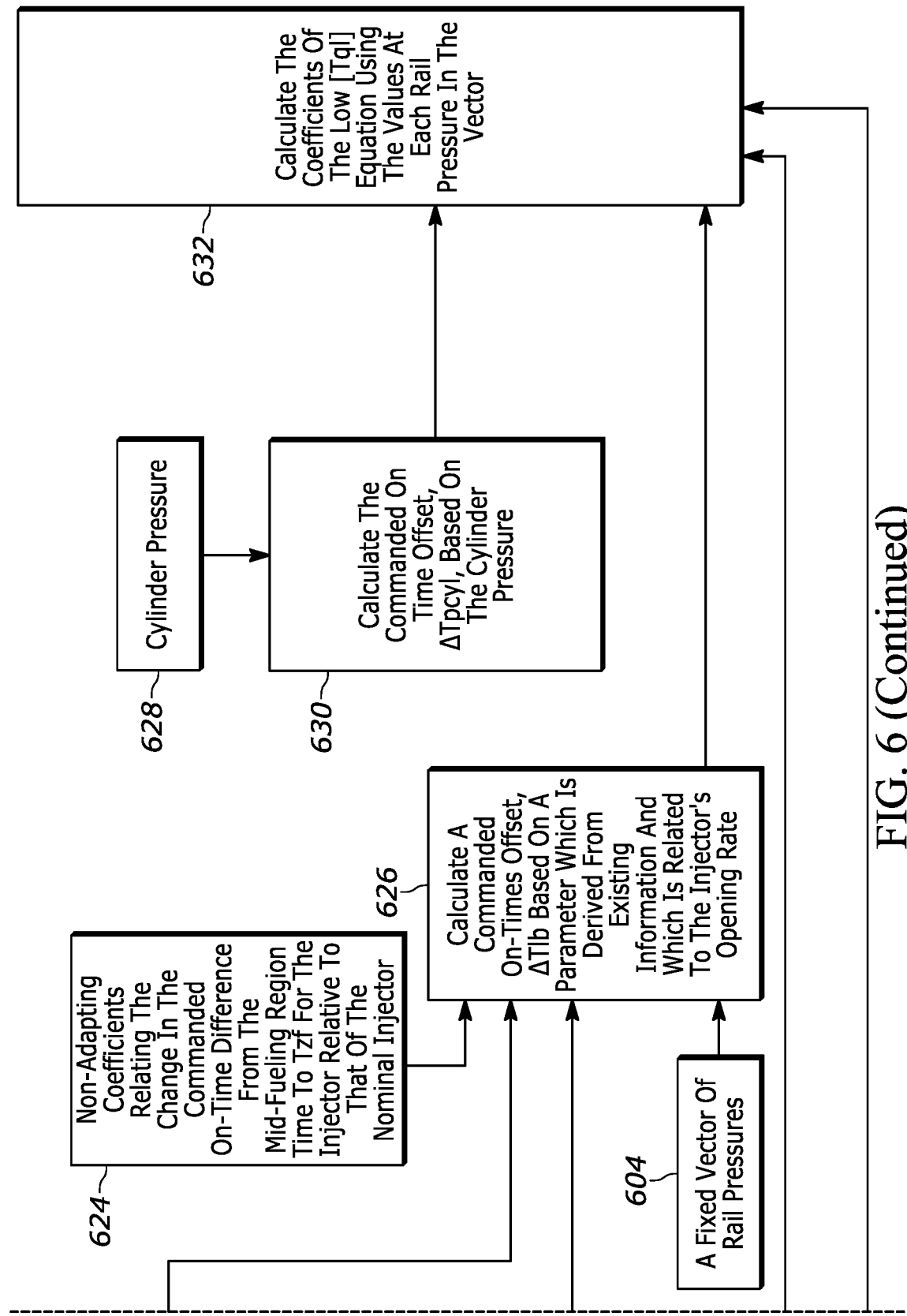

FIG. 6 is a flowchart that can be used to describe a method 600 by which control system 20 operates engine 10 to collect parameter information that can be used to provide the injector-specific adaptive control. The flowchart shown in FIG. 6 can also be used to describe the method 600 by which control system 20 generates the equations using the collected parameter information and that may be used to control the engine 10 in embodiments.

At step 602, a plurality of individual Tzf values for a specific injector 30 of the engine 10 are calculated. As noted in FIG. 6, the Tzf values are determined for each of a plurality of rail pressures P in a vector. The pressures P of the vector at which the Tzf values are determined are specified at step 604. Steps 606, 608, 610, 612 and 614, which include controlling the engine 10 and fuel injectors 30 to generate the adaptive parameter information, are performed by the control system 20 in connection with the determination of the individual Tzf values at step 602.

Figure 7:
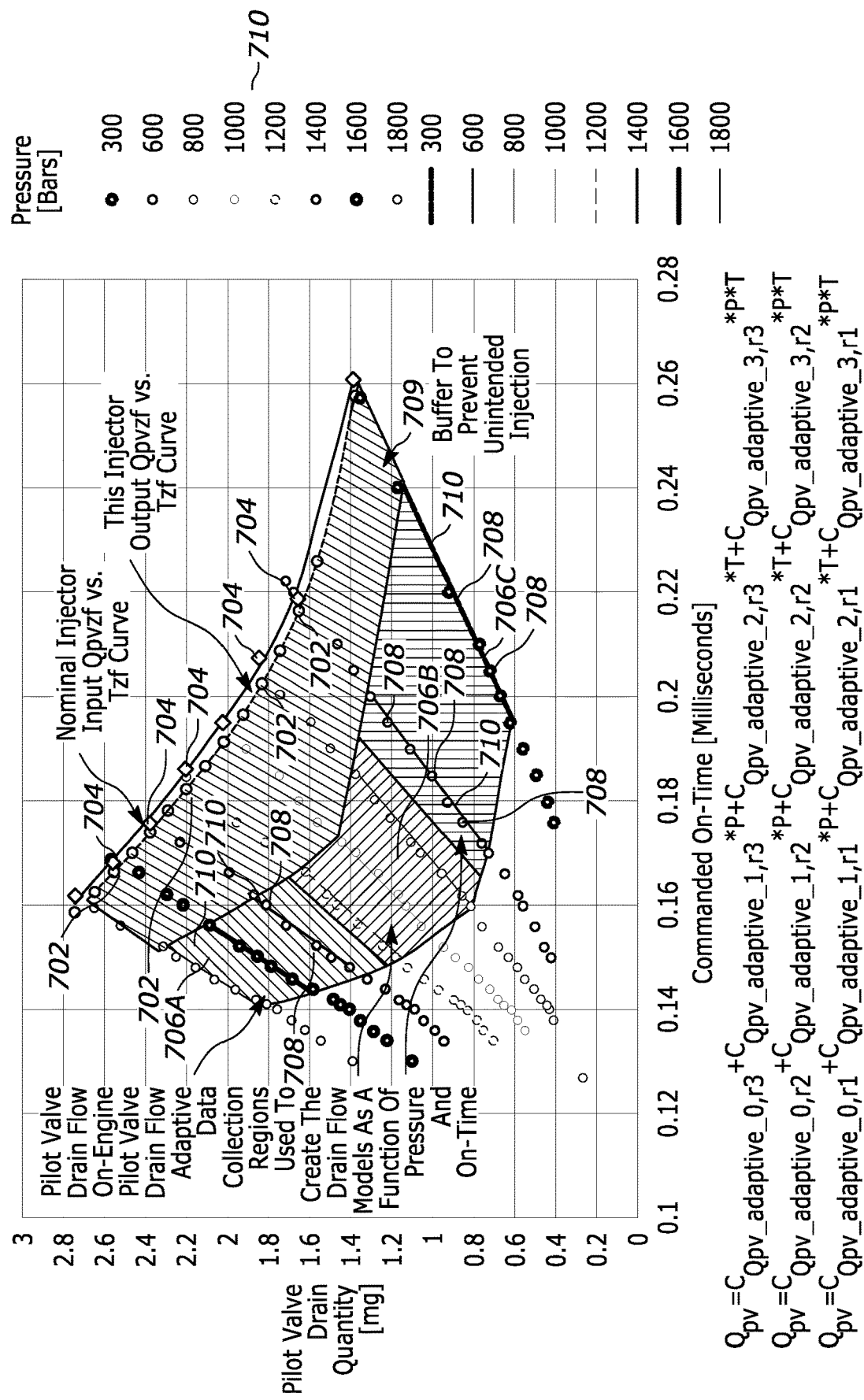
FIG. 7 is a graph that illustrates fuel injector pilot valve drain flow models, in accordance with embodiments.

FIG. 7 is a graph depicting a range of commanded on times on the x-axis and a range of pilot valve drain quantities on the y-axis that can be used to illustrate pilot valve drain flow models of injectors such as 30. As described above, the pilot valve drain flow model of a given injector 30 can be defined by its pairs of corresponding Tzf and Qpzf values at each of a plurality of rail pressures P. FIG. 7, for example, illustrates as the drain flow model for a specific injector 30, the pairs of individual corresponding Tzf and Qpzf values 702 (indicated by open circles) for a vector of rail pressures P of 300, 600, 800, 1000, 1200, 1400, 1600 and 1800 bars. The vector of individual rail pressures P used by the method 600 can be predetermined and specified as shown for example at step 604 in FIG. 6. The individual Tzf values calculated at step 602 correspond to the Tzf values 702 of the pilot valve drain flow model for the injector 30 shown in FIG. 7.

For purposes of example, FIG. 7 also illustrates individual corresponding Tzf_nominal and Qpzf_nominal values 704 (indicated by open diamonds) characterizing a pilot valve drain flow model of a nominal injector (e.g., an "average" injector that is different than the injector having the drain flow model characterized by the Tzf and Qpzf values 702, and that may be measured from a test rig). As is evident from FIG. 7, the drain flow model of the injector 30 characterized by the Tzf and Opzf values 702 is different than the drain flow model of the nominal injector characterized by the by the Tzf_nominal and Opzf_nominal values 704. Because of the differences between the specific injector 30 and the nominal injector that manifest as these different drain flow models, the specific injector 30 will operate differently than the nominal injector. In particular, in response to the same commanded on times, the specific injector 30 and the nominal injector will deliver different amounts of fuel. The effects of these variations may be particularly pronounced during low quantity fueling pulse events, such as those that result in the injectors operating completely or to at least partially in their ballistic regions. The adaptive control provided by control system 20 effectively compensates for these differences in operating characteristics between different injectors such as 30.

The region in the graph of FIG. 7 having on times T and associated drain quantities Qpv values less than those at on times Tzf of the drain flow model of the injector 30 defines the non-injection state region of the injector 30 (e.g., a region in which control signals representative commanded on times less than Tzf for the then-current rail pressure P will cause non-injection state operation of the injector). By method 600, the control system 20 operates the injectors 30 in the non-injection state to obtain the adaptive parameter information used at step 602 to determine the Tzf and Qpzf values 702 defining the pilot valve drain flow models of the injectors 30. FIG. 7, for example, illustrates three adaptive parameter collection regions 706A-706C in the non-injection state region for the injector 30. As shown in FIG. 7, the relationships between individual T and Qpv values 708 at each rail pressure P are relatively linear in the adaptive parameter collection regions 706A-706C. In embodiments, the adaptive parameter collection regions 706A-706C in which the control system 20 causes the collection of adaptive parameter information is separated by a buffer region 709 from regions where the Tzf and Qpzf values 702 of the pilot valve drain flow model of an injector 30 are anticipated to be. For example, the size of the buffer region 709 can be determined based on known drain flow models of a nominal injector such as 30. Other factors that may be used to determine the size of the buffer region 709 include the variability in the measured non-injection state pilot valve flow estimates, the control system confidence of the convergence of the equations, and the magnitude of the impact of unintended injection pulses on the overall engine and system.

At step 606, during operation in adaptive parameter information collection modes, control system 20 generates non-injection pulse control signals causing each of one or more of the injectors 30 to operate at a plurality of commanded on times T (e.g., adaptive parameter collection on times) at the differing operating rail pressures P, where the commanded on times are in the adaptive parameter collection regions 706A-706C. The control system 20 also determines the amount of pilot valve drain flow Qpv produced by the associated injectors 30 in response to each of the non-injection pulse control signals (e.g., using measurements of the corresponding change in rail pressure P as described above). The associated T and Qpv values, which define adaptive parameter information for the associated injector 30, are stored by the control system 20. In effect, pilot valve drain quantity-only commanded on times are commanded across all operating rail pressures of the vector and at pilot valve drain quantities in a range which has an upper bound far enough below Qpvzf to prevent any unintended injection events, and at a lower bound which is sufficient for the pilot valve drain model to accurately define the two-dimensional response surface and which is also high enough to be within the region in which the pilot valve drain is in the approximately linear region as a function of the commanded on-time at that rail pressure (e.g., a range of at least 0.5 mg in embodiments). The data may be obtained during a multi-pulse drain quantity event to improve the signal to noise ratio from the increased net pressure drop resulting from multiple drain pulses and at timings associated with low cylinder pressures on the injector being tested to increase the Qpvzf value required to produce injection and therefore reduce the probability of accidently producing an unintended injection event. In embodiments, for example, the measured commanded on time and measured state pressure (which are not limited to the rail pressures of the vector), and estimated pilot valve drain flow Qvp values may be data taken at the pressure measurement states used to determine the adaptive coefficients in Eqs. 7A, 7B and 7C (step 610). Then, using Eqs. 7A, 7B and 7C, the commanded on times relationship to the pilot valve drain quantity may be estimated at the pressures in the rail pressure vector (step 602).

At step 610, control system 20 makes use of an equation modeling the pilot valve drain flow quantities Qpv to the associated on time T and rail pressure P. Eq. 7 in FIG. 5 is an example of an equation defining a pilot valve drain flow model in accordance with embodiments. As shown, Eq. 7 is linear with commanded on time and has three adapting coefficients (Cqpv_adaptive_0, Cqpv_adaptive_1, Cqpv_adaptive_3) and one non-adapting coefficient (Cqpv_fixed_2). The sets of individual T and Qpv values 708 at each rail pressure P and characterized by Eq. 7 effectively define lines 710 representing the T/Qpv relationship of the specific injector at a given rail pressure P. In embodiments, to enhance the accuracy of the model, especially for applications with very low idle pressure, the operating region can be subdivided based on the rail pressure in which there is a unique form of Eq. 7, shown as Eqs. 7A, 7B and 7C in FIG. 5, which adapts on-engine in each of the rail pressure regions (e.g., the regions 706A, 706B and 706C shown in FIG. 7). In embodiments, for example, three drain flow model regions were used, the first below 650 bars, the second from 650 to 1250 bars, and the third above 1250 bars. As the model of Eq. 7 is only for pilot valve drain quantities below the on-time where injection can occur, this model is independent of the cylinder pressure. Other embodiments use other equations to model the pilot valve drain quantities of injectors. As shown at step 610 in FIG. 5, using the model such as Eq. 7, the coefficients of the pilot valve drain flow response surface of the injectors 30 can be adapted. Kalman or other filtering methodologies may be used in connection with step 610.

The one or more non-adaptive or fixed coefficients such as $C_{pv\_fixed\_2}$ may be determined based on rig testing (e.g., using a nominal injector such as 30). The illustrated fixed coefficient represents the value of the slope $\partial Q_{pv}/\partial T$ when the rail pressure is zero. This coefficient is expected to increase as a function of the rail pressure P.

The partial derivative of Eq. 7 with respect to the commanded on-time is given by Eq. 8 in FIG. 5, and is only a function of rail pressure P. Therefore, at any rail pressure P, the pilot valve drain quantity Qpv below Tzf may be modeled as a linear function with respect to the commanded on-time T. Tests have demonstrated that this simple near linear relationship with respect to pressure is a good approximation for certain injectors, especially for pilot valve drain quantities generally above 0.5 mg, and aids in making the entire process computationally relatively simple.

Figure 8:
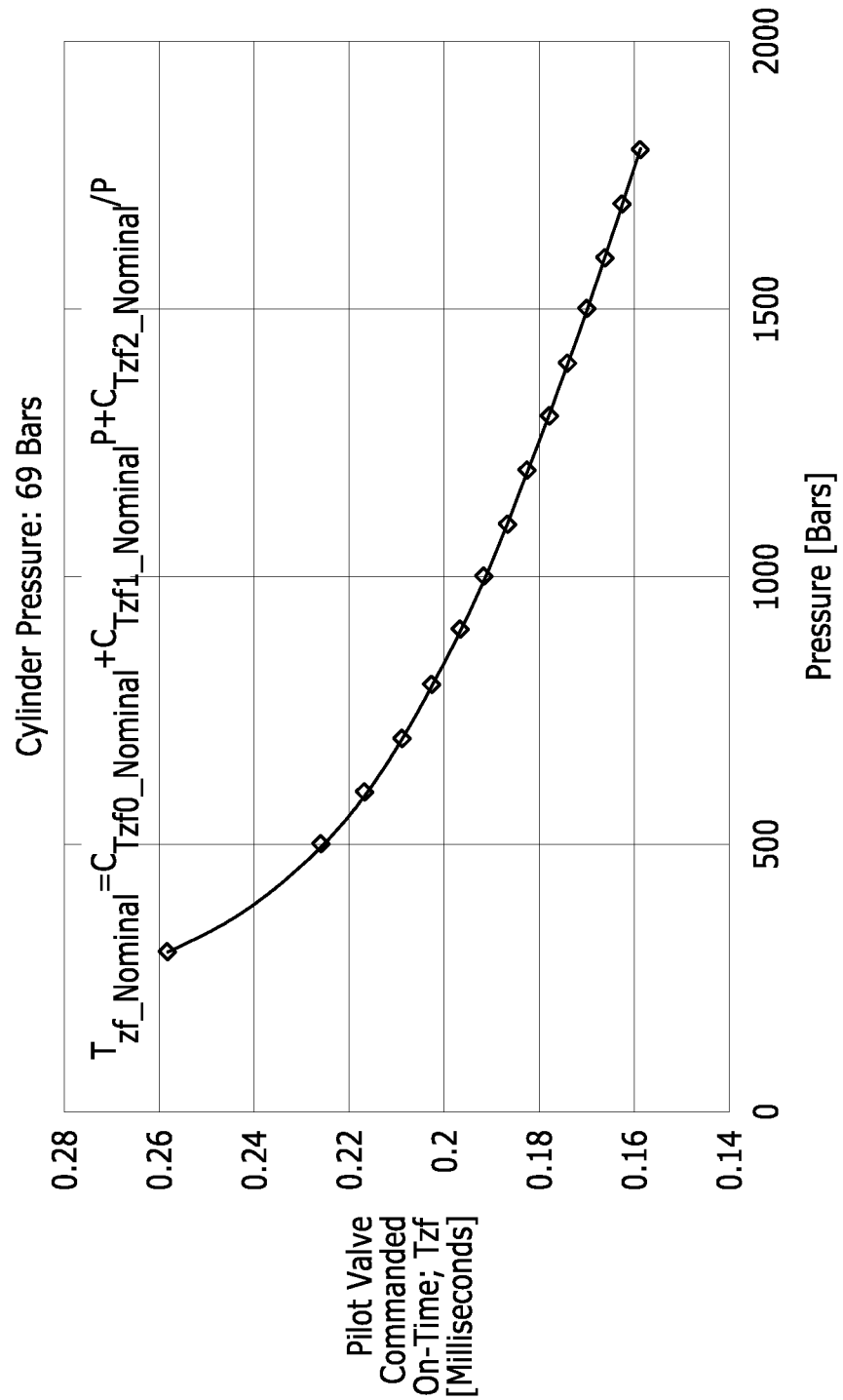
FIG. 8 is a graph that illustrates a commanded on time of an exemplary nominal fuel injector based on rail pressure, in accordance with embodiments.
Figure 9:
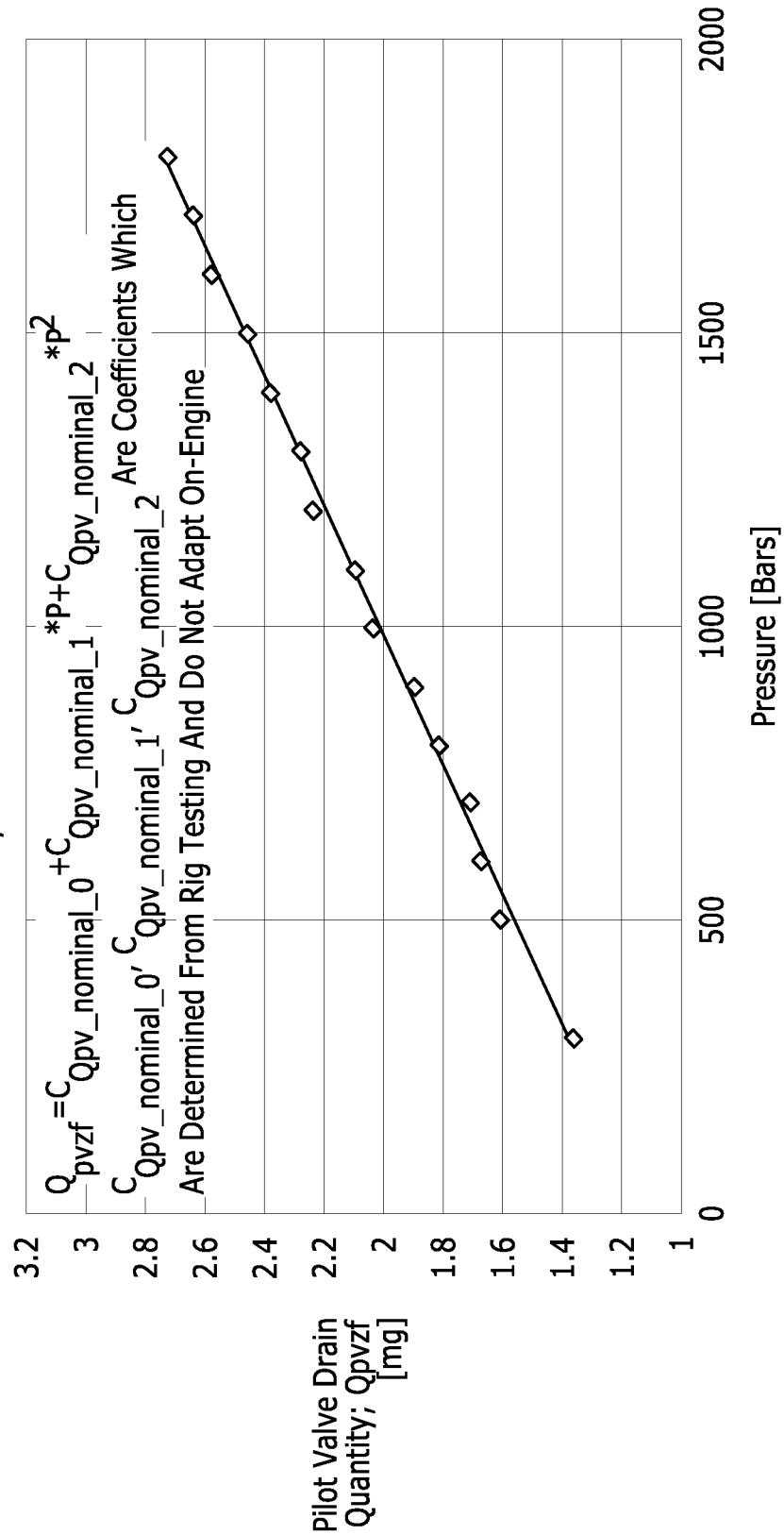
FIG. 9 is a graph that illustrates a pilot valve drain flow of an exemplary nominal fuel injector based on rail pressure, in accordance with embodiments.

The determinations of Tzf and Qpvzf at step 602 make use of other non-adapting parameters that may be obtained from a nominal injector. In embodiments, the method 600 uses nominal injector Tzf (Tzf_nominal) and Qpvzf (Qpvzf_nominal) values representative of the nominal injector's zero flow on time Tzf_nominal at which the injector transitions to its injection state operation, and the injector's pilot valve drain flow Qpvzf_nominal at Tzf_nomoinal, as represented by the values 704 in FIG. 7 (shown as diamonds). At step 612, control system 20 makes use of an equation modeling or defining the values Tzf_nominal and Qpvzf_nominal as a function or based on rail pressure P. Eq. 9 in FIG. 5 is an example of an equation used by embodiments of control system 20 to define Tzf_nominal based on rail pressure P. Eq. 10 in FIG. 5 is an example of an equation used by embodiments of control system 20 to define Qpvzf_nominal. In connection with the illustrated embodiments of Eq. 9, $C_{Tzf0\_Nominal}$, $C_{Tzf1\_Nominal}$, $C_{Tzf2\_Nominal}$ are nominal coefficients which may be determined from rig testing. These coefficients for the nominal injector may be fixed and non-adapting on-engine. In contrast, the $C_{Tzf0}$, $C_{Tzf1}$, and $C_{Tzf2}$ coefficients for individual injectors may adapt on-engine based on estimated pilot valve drain quantity from pressure drop measurements. In connection with the illustrated embodiments of Eq. 10, $C_{Qpv\_nominal\_0}$, $C_{Qpv\_nominal\_1}$, $C_{Qpv\_nominal\_2}$ are coefficients which may be determined from rig testing and may be fixed and non-adapting on-engine. FIG. 8 is a graph illustrating exemplary commanded zero flow on times as a function of rail pressure P for an exemplary nominal injector. FIG. 9 is a graph illustrating exemplary pilot valve drain flow quantities as a function of rail pressure P at zero flow on times for an exemplary nominal injector.

Figure 10:
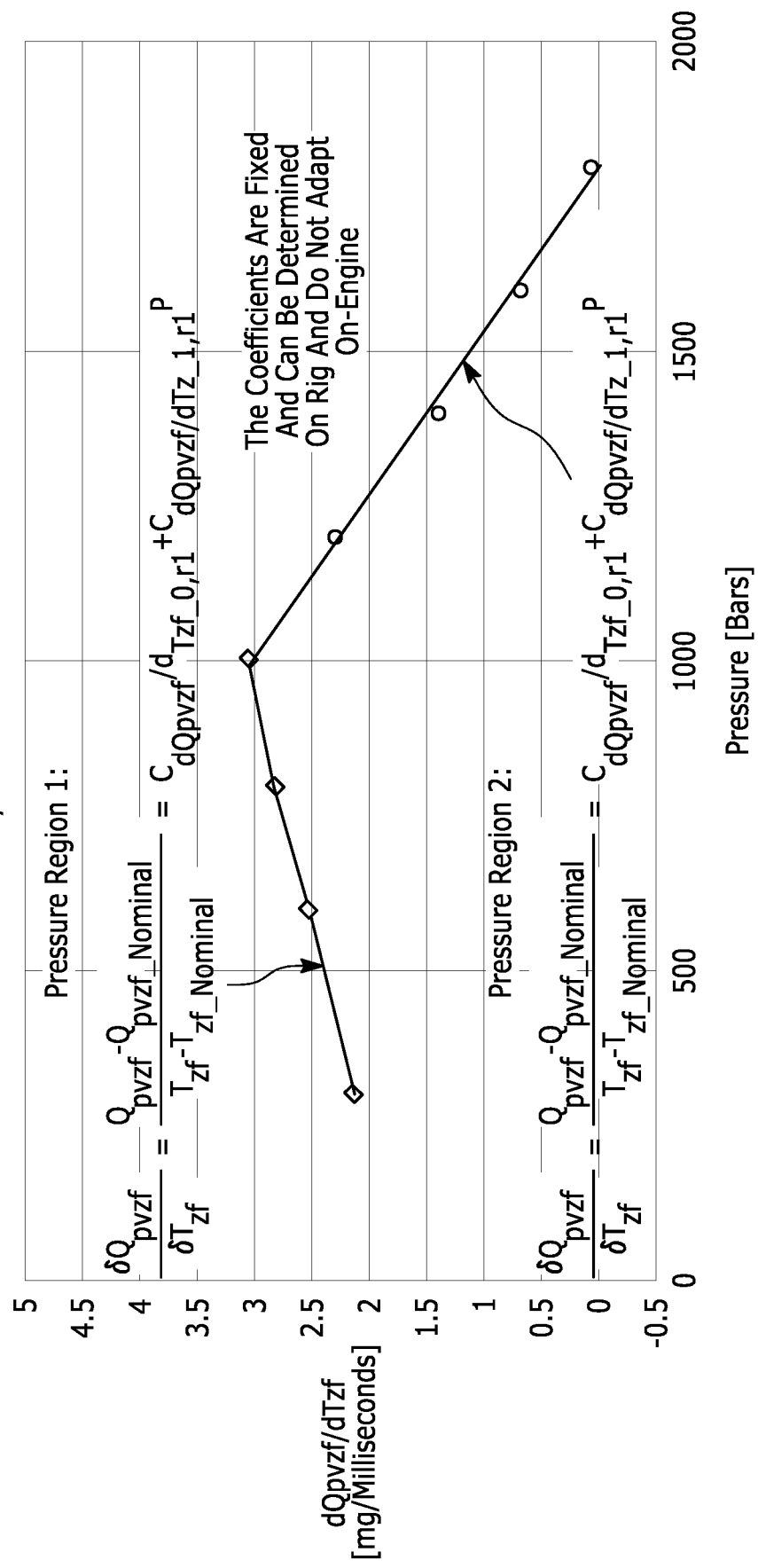
FIG. 10 is a graph that illustrates changes in pilot valve drain flow of an exemplary nominal fuel injector based on rail pressure in accordance with embodiments.

Injectors 30 which tend to require longer commanded on-times in order to inject a fuel quantity greater than zero tend to have larger pilot valve drain flow quantities at relatively higher Tzf values. A relationship between Qpvzf and Tzf can be obtained from the performance rig testing of nominal and DOE (design of experiment) injectors. The relationship between Qpvzf and Tzf is a function of the rail pressure P and the cylinder pressure. The relationship between Qpvzf and Tzf may be a relationship with fixed coefficients which do not adapt on-engine. A relationship for $\partial Q_{pvzf}/\partial T_{zf}$ delta Qpvzf/delta Tzf (e.g., changes in Qpvzf with as a function of Tzf) which is a linear function of the rail pressure P, can be defined by Eq. 11 in FIG. 5B. As reflected in FIG. 5B, delta Qpvzf/delta Tzf is a function of the individual and corresponding Qpvzf and Tzf values, the nominal Qpvzf and nominal Tzf values represented by Eqs. 10 and 9 respectively (which are a function of non-adapting coefficients and rail pressure P) and rail pressure P. As illustrated diagrammatically in FIG. 11, Eq. 11 effectively defines lines 712 having slopes of the Qpv/T relationship of a specific injector 30 at a particular rail pressure P that extend though the corresponding Tzf_nominal and Qpvzf_nominal values 704 at the same rail pressure P. In embodiments, Eq. 11 can be subdivided within pressure regions as is shown by Eqs. 11A and 11B in FIG. 5B. FIG. 10 is a chart showing the relationship for exemplary injectors in which the relationship is subdivided in two rail pressure regions corresponding to those of Eqs. 11A and 11B. The chart of FIG. 10 shows the relationship at one cylinder pressure. However, in a similar manner, the relationships at other cylinder pressures can be provided based on performance rig test results with differing rate tube pressures.

Figure 11:
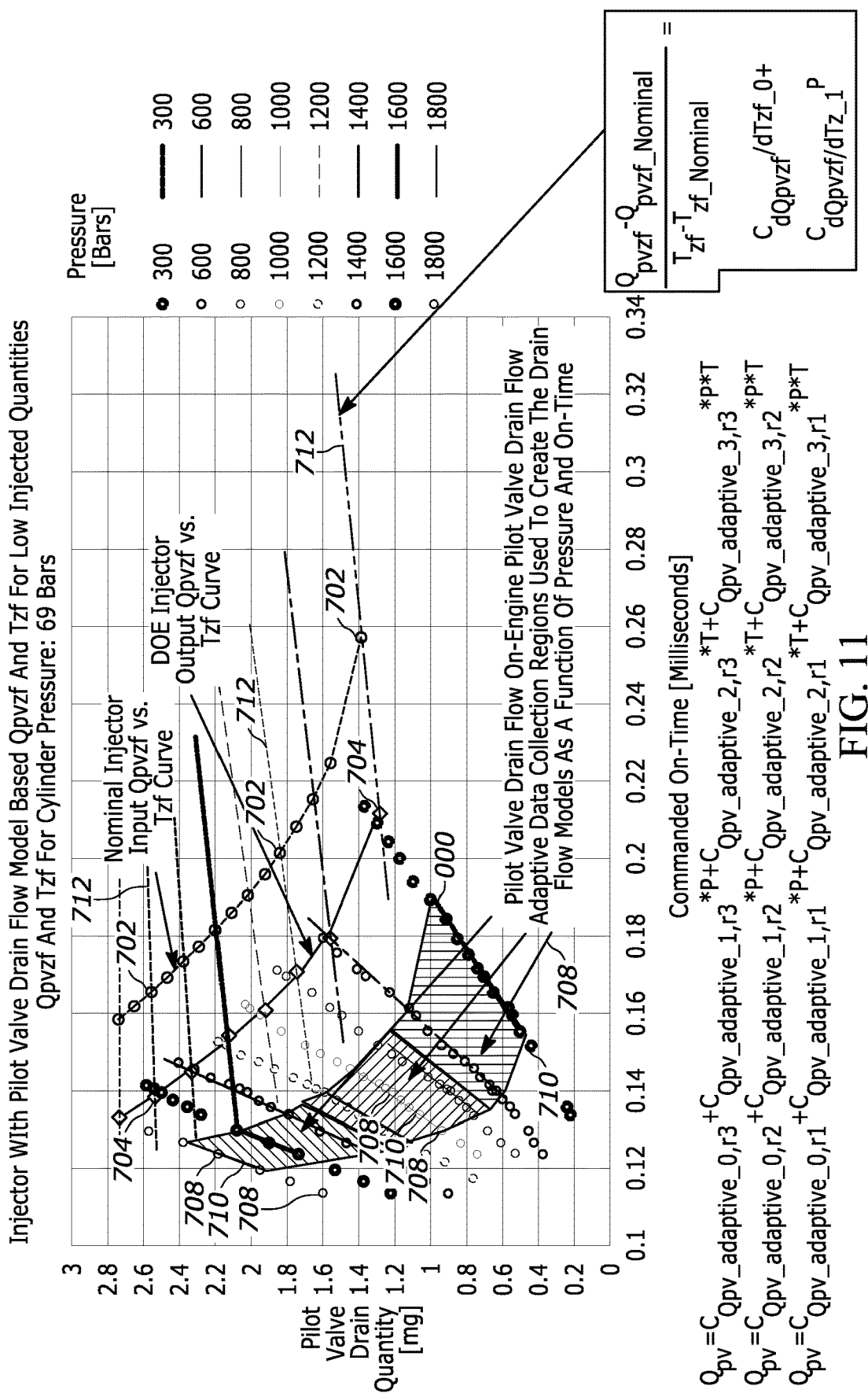
FIG. 11 is a graph that illustrates fuel injector pilot valve drain flow models, in accordance with embodiments.

FIG. 11 is a graph similar to that of FIG. 7, but for purposes of illustration shows the Tzf_nominal and Qpvzf_nominal values 704 defining the drain flow model of the nominal injector and the Tzf and Qpvzf values 702 defining the drain flow model of a specific injector 30 spaced further apart. The lines 710 defined by the T and Qvp values 708 and Eq. 7 at several different rail pressures P are shown. Also shown are the lines 712 defining the slopes of the T/Qpv relationship of the specific injector 30 at the corresponding and different rail pressures P that extend though the corresponding Tzf_nominal and Qpvzf_nominal values 704 at the corresponding rail pressures P.

At step 602 the control system 20 performs an on-engine adaption by determining the Tzf and Qpvzf values 702 at each rail pressure P of the vector by effectively simultaneously solving Eq. 7 and Eq. 11 at the corresponding rail pressure P. Because both Eqs. 7 and 11 describe an independent linear relationship between Tzf and Qpvzf at the given rail pressure P (e.g., lines 710 and 712), the simultaneous solution of these two equations corresponds to the intersections of the lines and the corresponding Tzf and Qpvzf values 702. Eq. 12 in FIG. 5B describes the values Tzf as a function of the known non-adaptive and measured adaptive coefficients of Eqs. 7 and 11 and the rail pressure P. Eq. 13 in FIG. 5B described the values Qpvzf as a function of the known non-adaptive and measured adaptive coefficients of Eqs. 7 and 11 and rail pressure P.

Each time a new drain flow measurement is taken during an adaptive parameter information collection mode operation, control system 20 updates or adapts the coefficients in the Eqs. 7 and 11 (e.g., in the appropriate regions). The process is conducted across the rail pressures P of the vector to define Tzf and Qpvzf as a function of a range of rail pressures. Control System 20 can then use the updated and most current information characterizing a given injector 30, such as Tzf, to generate a control signals having a commanded on time that will produce the desired injected fuel pulse quantity (e.g., low fuel quantity) during normal operation of the engine 10 (e.g., in response to a command for an injection pulse event).

Figure 12:
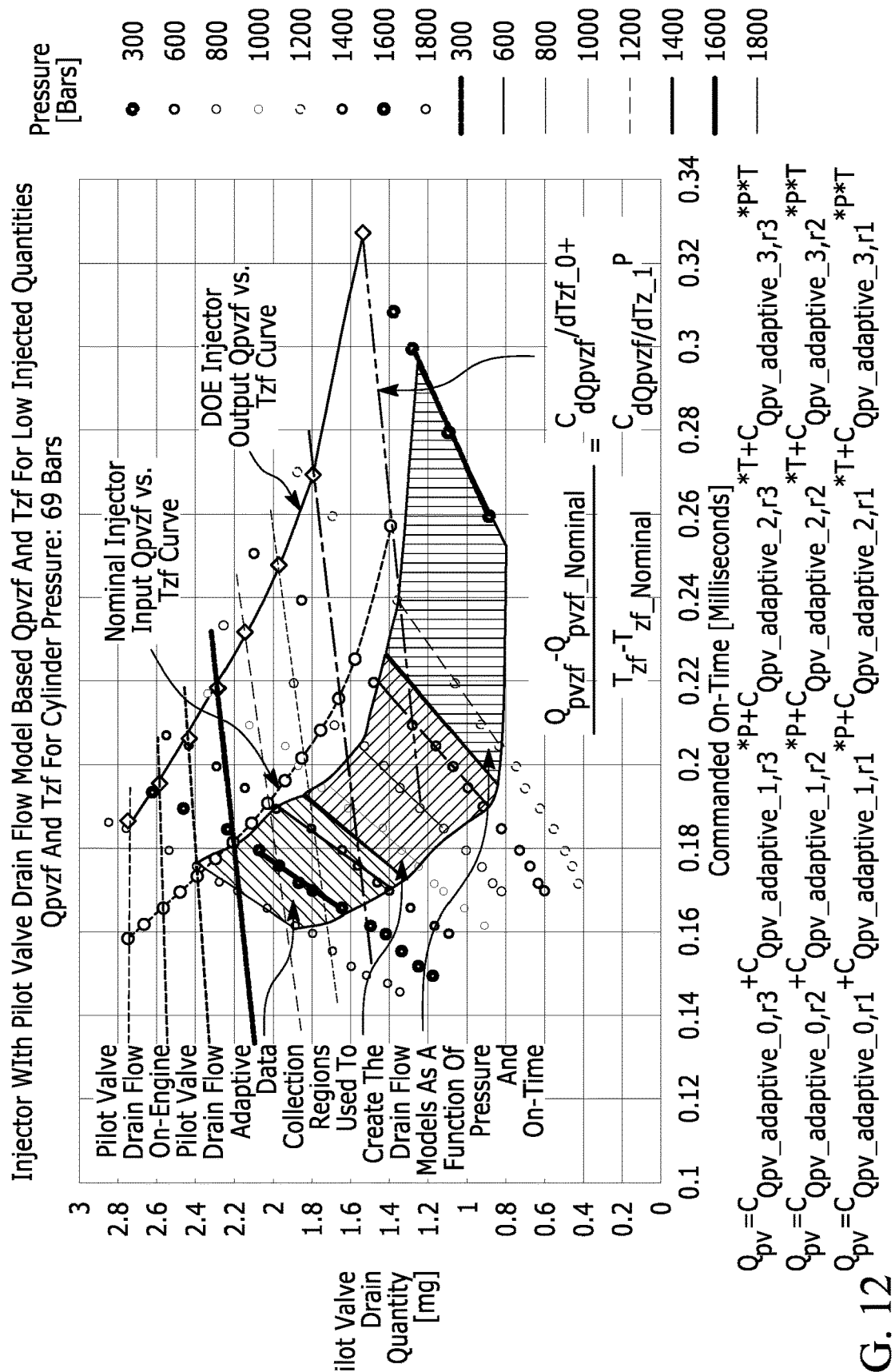
FIG. 12 is a graph that illustrates fuel injector pilot valve drain flow models, in accordance with embodiments.
Figure 13:
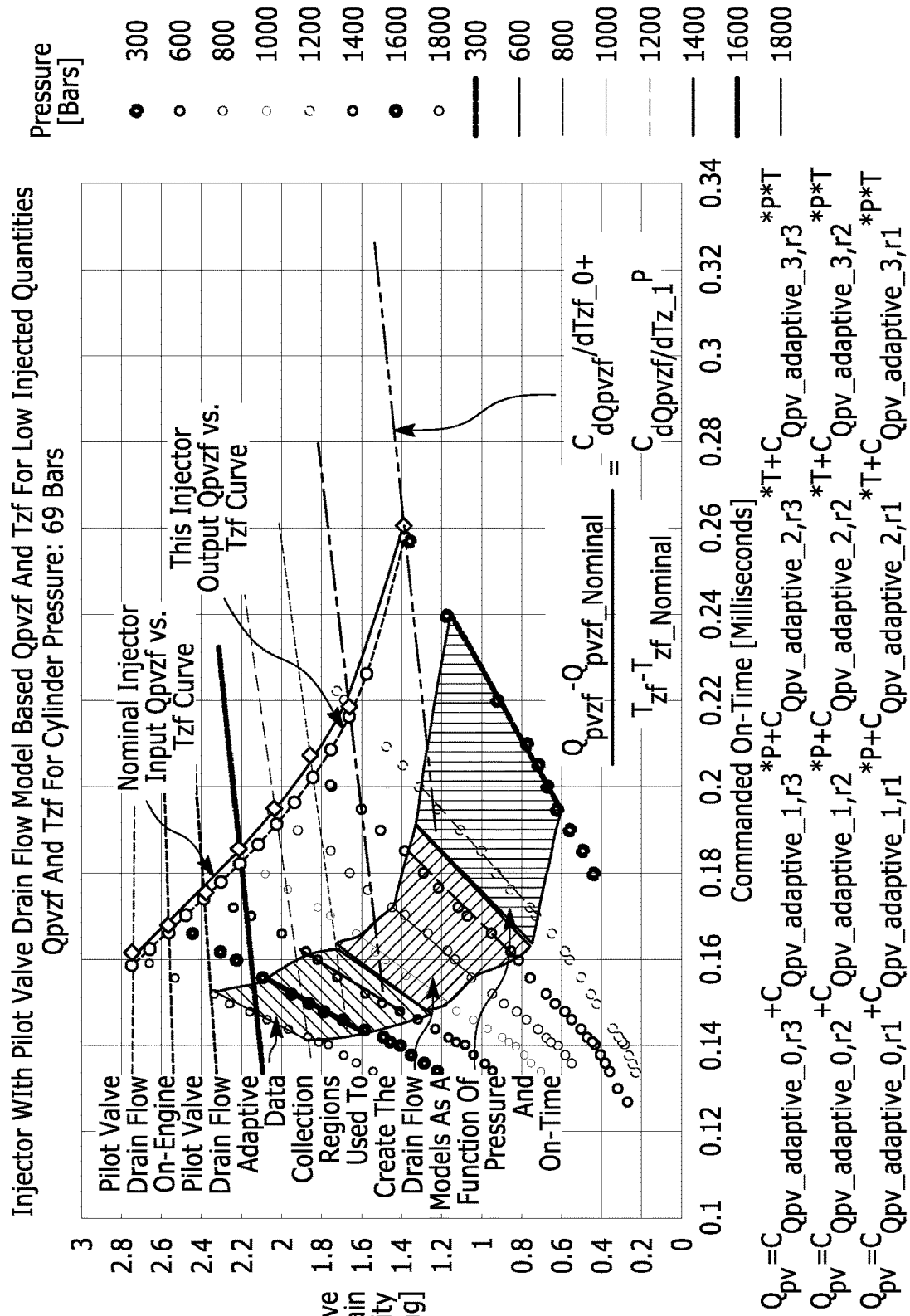
FIG. 13 is a graph that illustrates fuel injector pilot valve drain flow models, in accordance with embodiments.

The example injector 30 represented in FIG. 11 has a pilot valve opening response time which is generally less than that of the nominal injector by about 350 microsecond. FIG. 12 is a graph of a pilot valve drain flow model for a different injector 30 that that has a pilot valve opening response time that is generally greater than the nominal injector by about 550 microsecond. FIG. 13 is a graph of a pilot valve drain flow model for a different injector 30 that as a pilot valve opening response time that is generally close to that of the nominal injector.

The adaptive parameter data and/or corresponding individual updated values of Tzf can be stored and used by control system 20 during normal engine operation (e.g., as a look-up table or adaptive parameter information or coefficients, or as look-up table of Tzf values). In other embodiments, at step 616 of method 600 (FIG. 6), the control system 20 uses the information determined at step 602 to compute updated coefficients of an equation such as Eq. 2 (FIG. 5A) describing Tzf as a continuous function of rail pressures P. In embodiments, for example the on-engine adaption process may use a least squares method to simultaneously solve for Tzf and Qpvzf at each rail pressure using both Eq. 7 and Eq. 11 to simply find the intersecting Tzf and Qpvzf values at multiple rail pressures in order to adapt the Tzf equation for each injector 30 following each measurement. A fixed input vector of pressures P may be input in the calibration where the individual values of the rail pressures in the vector correspond to the pressures where the most accurate low quantity fuel pulses are desired. In the data for exemplary DOE injectors there were eight pressures in the vector: 300, 600, 800, 1000, 1200, 1400, 1600 and 1800 bars, and the input Tzf value for each of the pressures in the pressure vector may be solved using Eq. 12 (FIG. 5B).

The three coefficients Ctzf0, Ctf1 and Ctzf2 in Eq. 2 can be directly solved using Eq. 14 shown in FIG. 5B. Since the symmetric matrix to be inverted is fixed in the calibration and is dependent only on the input pressure vector, there are six $i_{xx}$ terms that can be precalculated in the calibration as shown by Eq. 15 in FIG. 5B. The three coefficients in the Tzf Eq. 2 can be directly calculated using Eqs. 16A-16C shown in FIG. 5C.

Tcq

Figure 14:
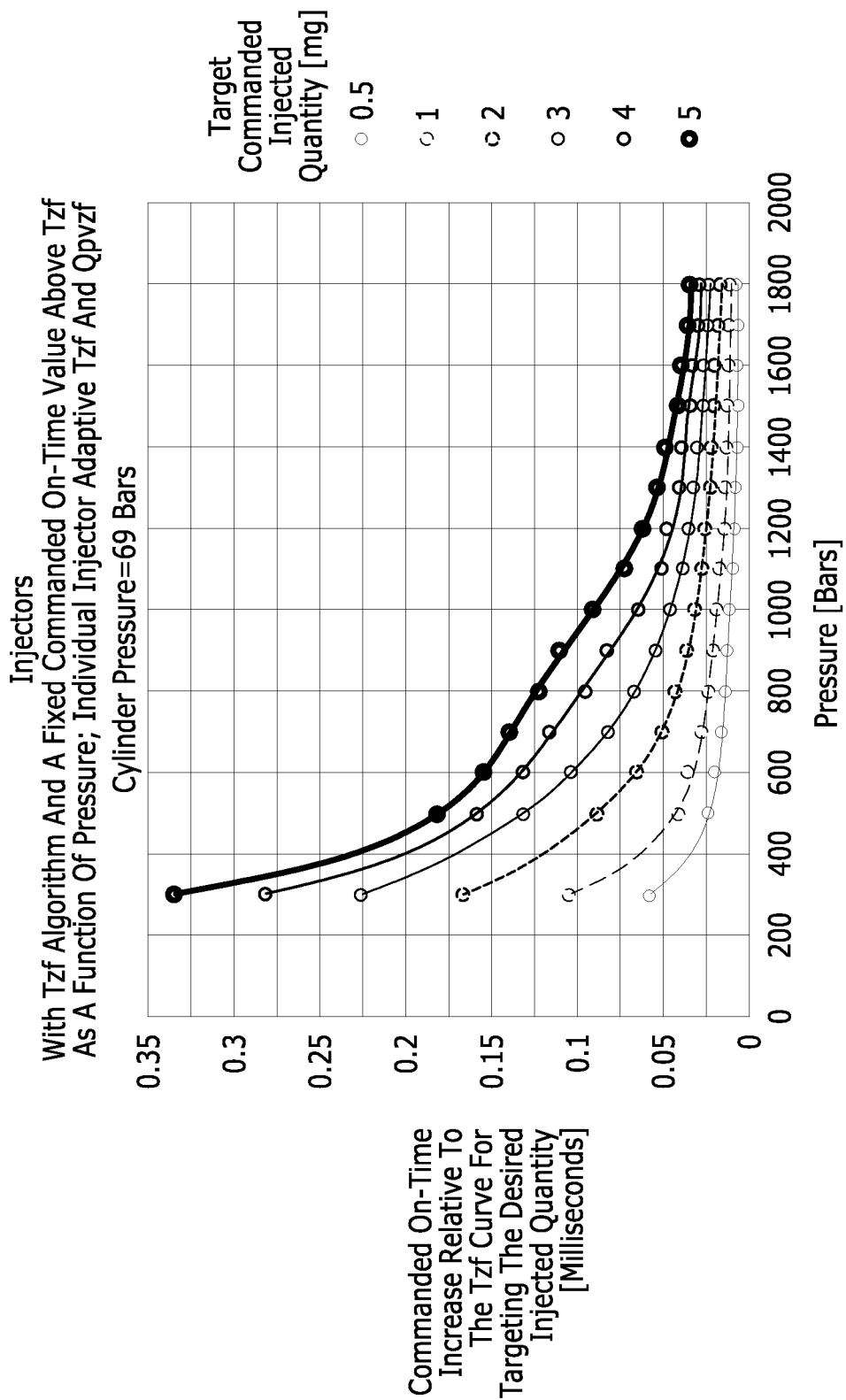
FIG. 14 is a graph that illustrates additional commanded on times relative to zero flow on times based on rail pressure for a fuel injector to injects desired commanded quantities of fuel, in accordance with embodiments.

As described above, embodiments of control system 20 make use of a delta commanded on time that is added to the zero flow on time Tzf to determine a commanded on time to produce a low fuel quantity injection pulse. In embodiments, the additional on time representative of the amount of fuel includes a non-adapting delta commanded on time Tcq, which is a function of the desired injection quantity, the rail pressure P and cylinder pressure Pcyl. FIG. 14 is a graphical example of Tcq values for an exemplary injector 30 for injected fuel quantities at and below certain relatively low levels as a function of rail pressures P at a specific cylinder pressure Pcyl. Tcq values will generally increase with the desired injected quantity, with lower operating (e.g. rail) pressures P, and with lower cylinder pressures Pcyl. In embodiments, a tabular look-up table structure is used to represent the Tcq values in control system 20. Other embodiments use coefficients or other information defining a continuous set of Tcq values (e.g., based on rail pressure P and optionally cylinder pressure Pcyl. The table values or equation coefficients may be obtained from a test rig. In the flowchart of FIG. 6, step 620 represents the determination of Tcq values.

ΔTlb Parameter Information Collection

Embodiments of control system 20 also make use of an adapting delta commanded on time component ΔTlb that is added to the zero flow on time Tzf to determine a commanded on time to produce a low fuel quantity injection pulse. Injectors 30 that have parameters which are biased toward making the injector's lower plunger or nozzle valve 210 open at a higher velocity (e.g., in the ballistic region) than that of a nominal injector at an operating rail pressure P and cylinder pressure Pcyl may tend to have higher injected quantities of fuel for a given on time, particularly in relatively low injection portions of the ballistic region. Since these same parameters also tend to increase the injected quantity provided by the nozzle valve 210 of the injector 30 throughout the entire operating region of the injector for which the nozzle valve 210 is operating in a ballistic manner, data or other information from the injected fueling response to a change in the commanded on-time in the ballistic fueling regions, such as for example in a mid-fueling ballistic region of the injector (which may be adaptively calculated and stored in accordance with conventional or otherwise known approaches and/or approaches similar to those described herein in connection with the non-injection state parameter collection) may be used to improve the estimate of the injected quantity by control system 20 in low and other fueling regions (e.g., without having to take additional fueling measurements in the low injected quantity fueling region). The embodiments of method 600 described herein effectively use information from the ballistic operating range of the specific injector 30 as a virtual sensor to enhance the accuracy of low fuel quantity injection pulses.

Embodiments of control system 20 use Eq. 17 (FIG. 5C) to define a value ΔTbf_nominal as the difference between a commanded on time associated with a ballistic (e.g., ballistic mid-fueling) region injected fuel quantity which is fixed and non-adaptive as a function of rail pressure P for a nominal injector (Tbf_nominal), and the Tzf value at each rail pressure P in the vector for the nominal injector (Tzf_nominal). Data representative of the ΔTbf_nominal can be determined from nominal injectors, for example by rig testing, and stored by the control system 20. Similarly, the control system 20 may use Eq. 18 (FIG. 5C) to define a value ΔTbf_individual as the difference between a commanded on time associated with a specific injector 30 in the ballistic (e.g., ballistic mid-fueling) region injected as a function of rail pressure P (Tbf_individual) and the Tzf value at each rail pressure P in the vector for the specific injector 30 (Tzf_individual). As shown by Eq. 19, an input for the virtual sensor in connection with the generation of low quantity fueling pulses, ΔTb, can be defined by the difference between the commanded on times ΔTbf_individual and ΔTbf_nominal. In the embodiments of the method 600 illustrated in FIG. 6, steps 622 and 624 describe the determination of the Tbf_nominal and Tbf_individual values, respectively. A fixed vector of injected quantities associated with each pressure vector value is input and fixed in the calibration and is targeted and set to remain within the lower plunger ballistic region. By this approach injected quantity values may minimize or otherwise optimize low injected quantity error and minimize or optimize sensitivity to cupflow changes.

Eq. 20 in FIG. 5C describes a relationship used by embodiments of control system 20 to determine ΔTlb based on ΔTb. In Eq. 20, Clb are fixed non-adapting values are each rail pressure P of the pressure vector.

As described by Eq. 3 in FIG. 5A, the resulting commanded on time Tql can be based on both the non-adapting delta commanded on time value Tcq and the adapting delta commanded on time value ΔTlb. Eq. 4 in FIG. 5A is a curvefit form for Tql as a continuous function of rail pressure. In embodiments, the accuracy of method 600 may be enhanced by splitting Eq. 4 into similar equations for each of several distinct rail pressure regions (e.g., a low pressure region, a mid-pressure region, and a high pressure region) across the pressure vector (e.g., as represented at step 604 in FIG. 6). The input Tql values for each rail pressure P of the pressure regions in the pressure vector are determined using Eq. 3. The three adapting curvefit coefficients Cql0, Cql1 and Cql2 in Eq. 4 may be determined using Eq. 22 shown in FIG. 5C. Since the symmetric matrix to be inverted is fixed in the calibration and is only dependent upon the input pressure vector, there are seven uxx terms that can be precalculated in the calibration as shown by Eq. 23 in FIG. 5D. Eqs. 24A, 24C and 24D in FIG. 5D may be used to directly calculate the three coefficients Cql0, Cql1 and Cql2.

Figure 15A:
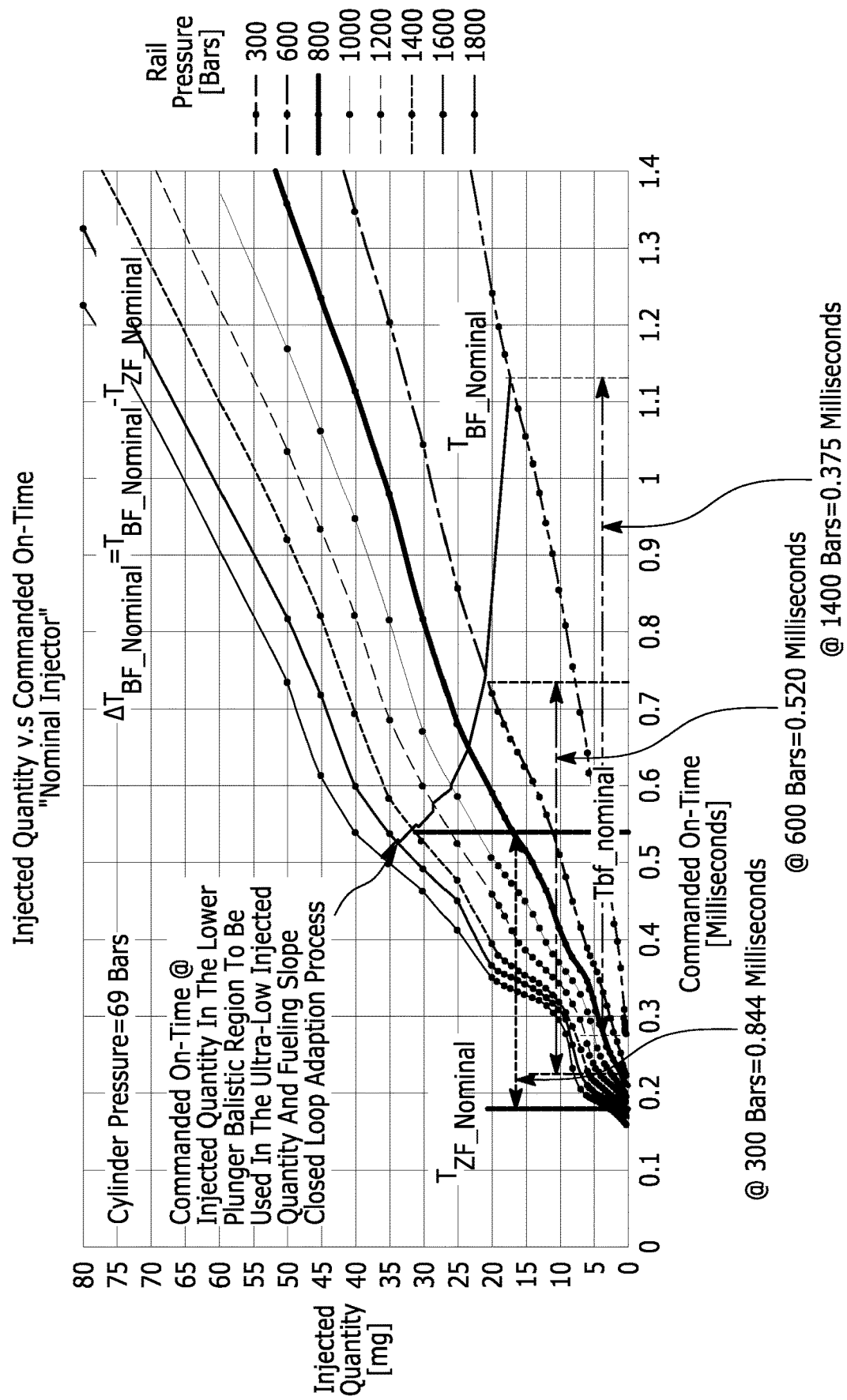
FIGS. 15A-15C are graphs illustrating injector-specific delays in nozzle valve opening in the ballistic region of injection state operation.
Figure 15B:
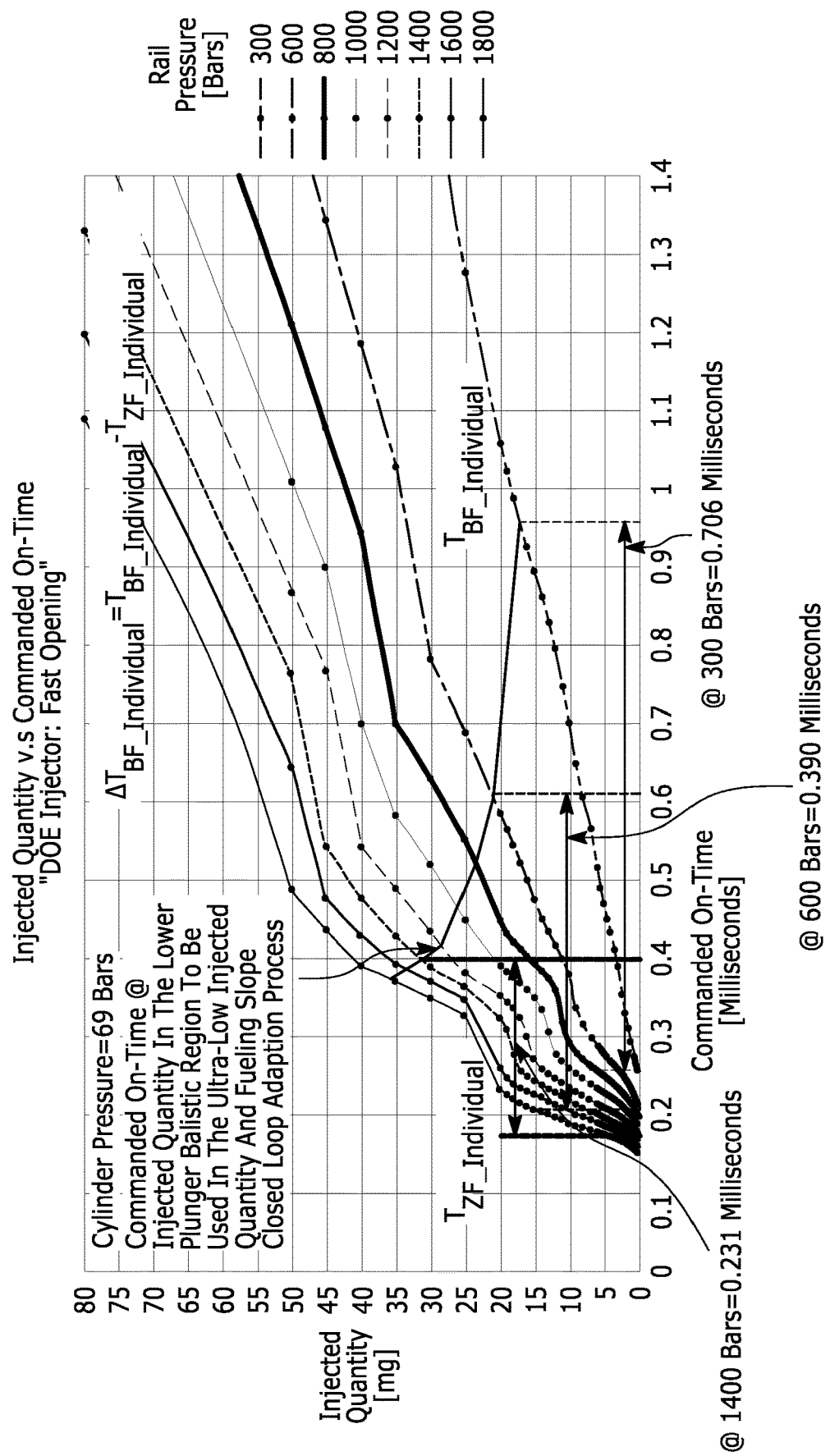
Figure 15C:
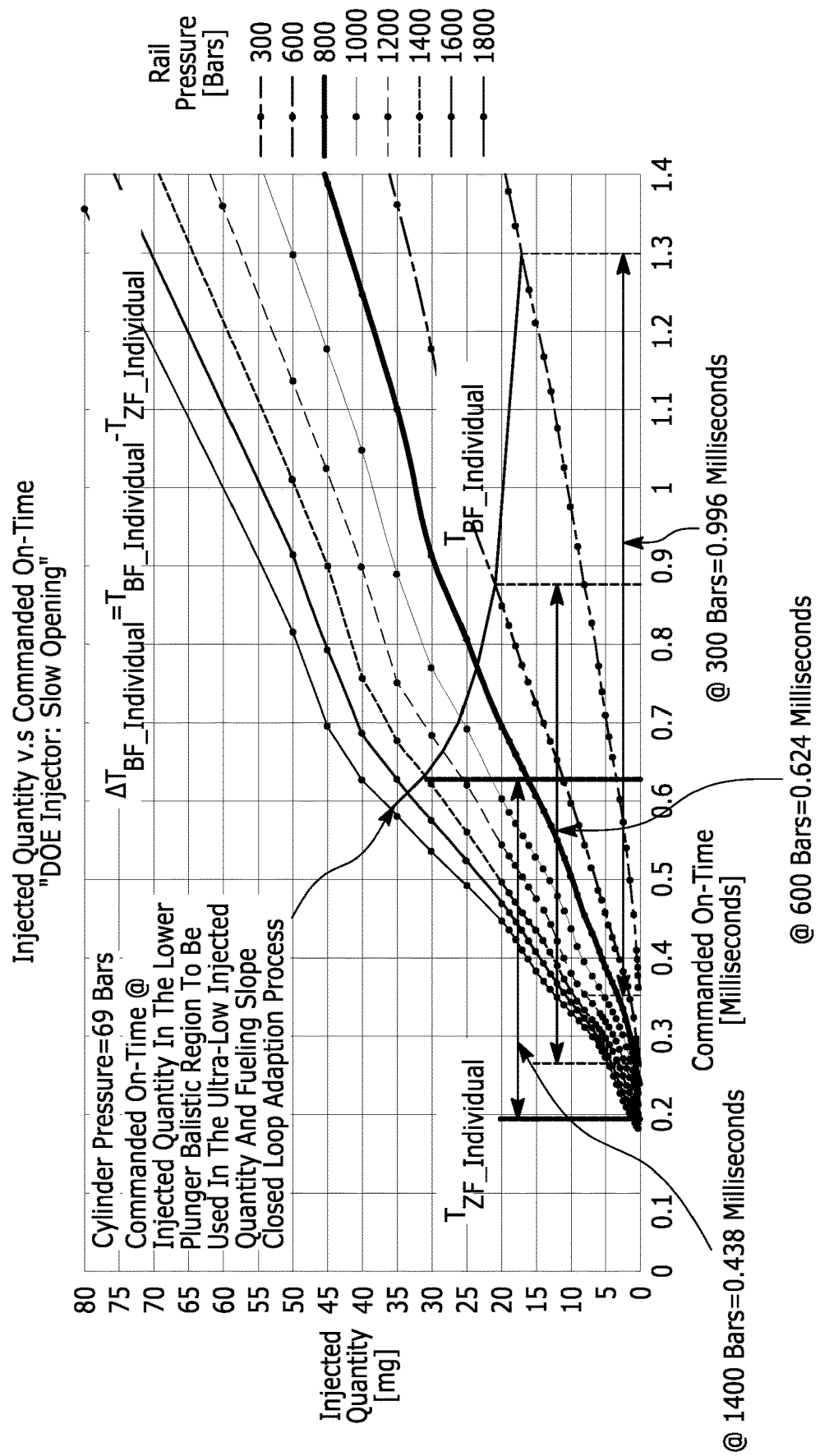
Figure 16:
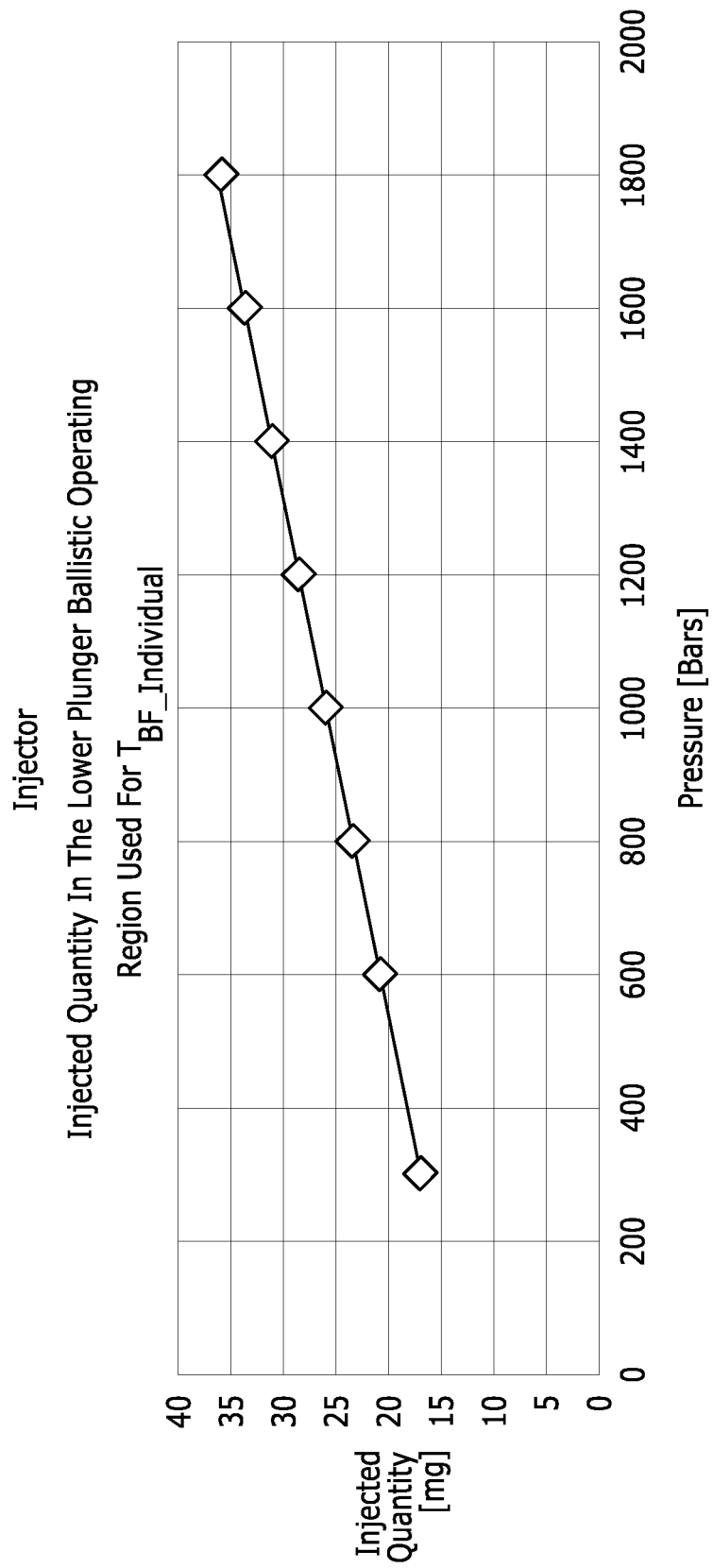
FIG. 16 is a graph illustrating injected fuel pulse quantities as a function of rail pressure in the lower ballistic region of injection state operation.
Figure 17A:
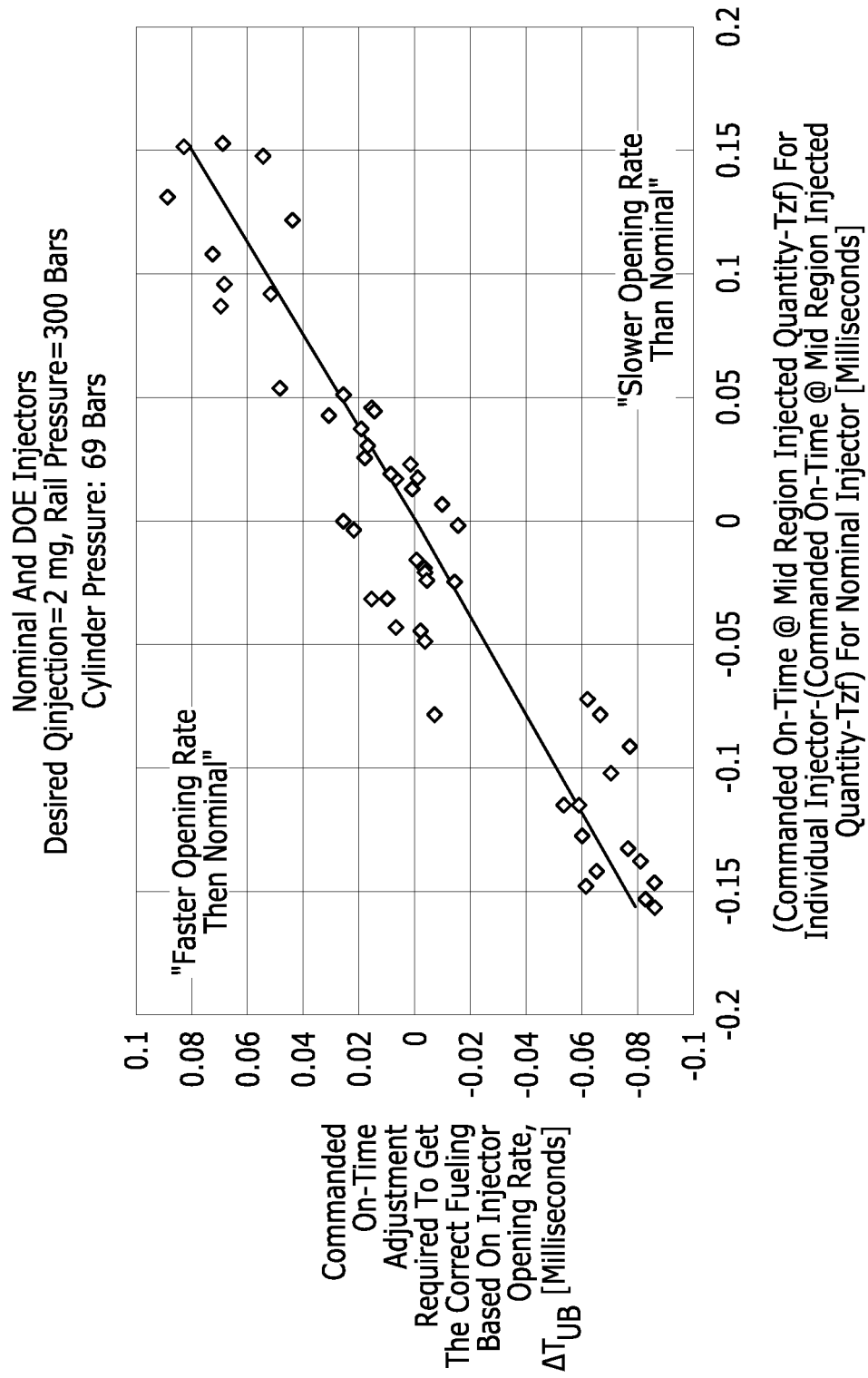
FIGS. 17A-17F are graphs illustrating relationships between commanded on time adjustments and commanded on time for nominal and design of experiments injectors at a number of different rail pressures.
Figure 17B:
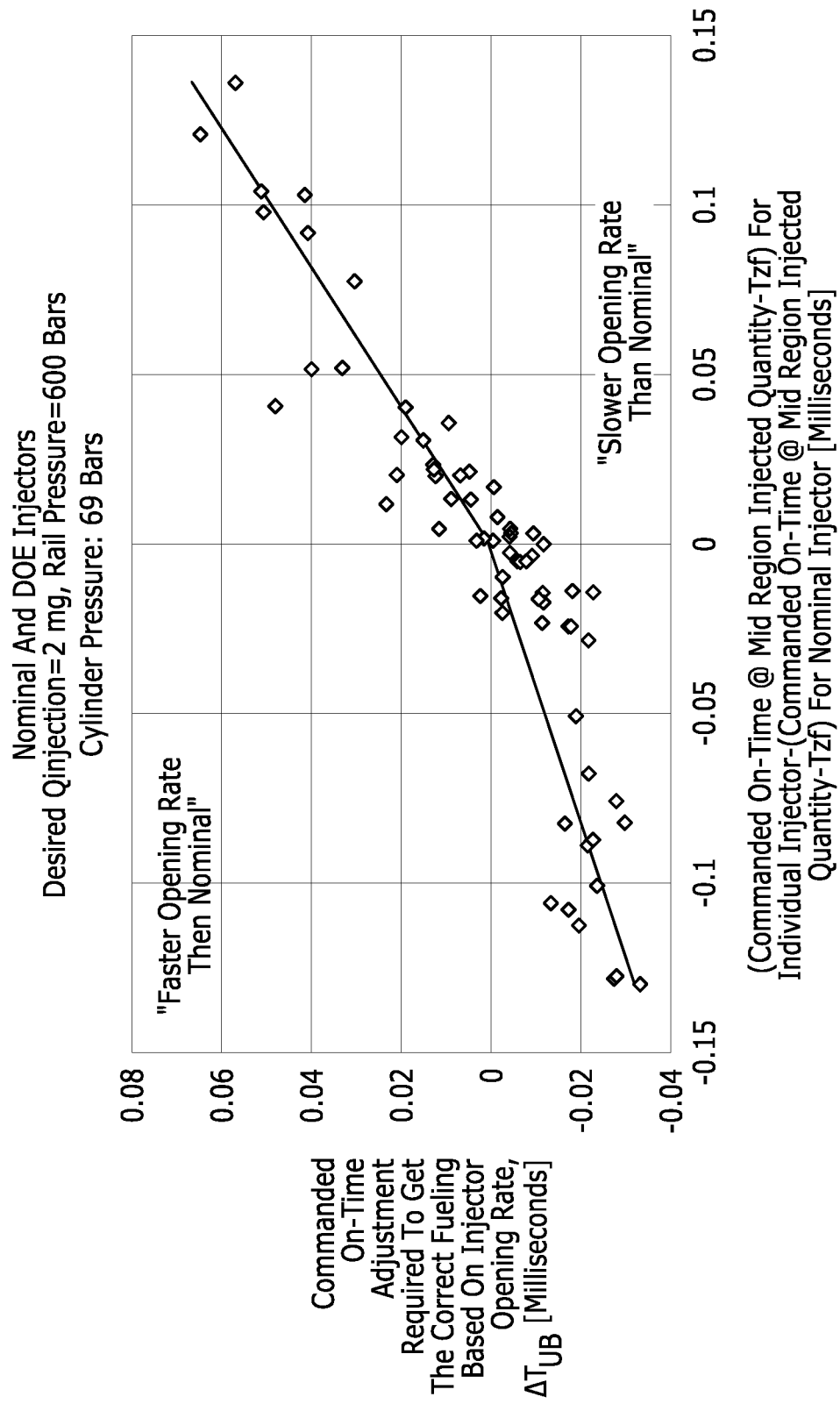
Figure 17C:
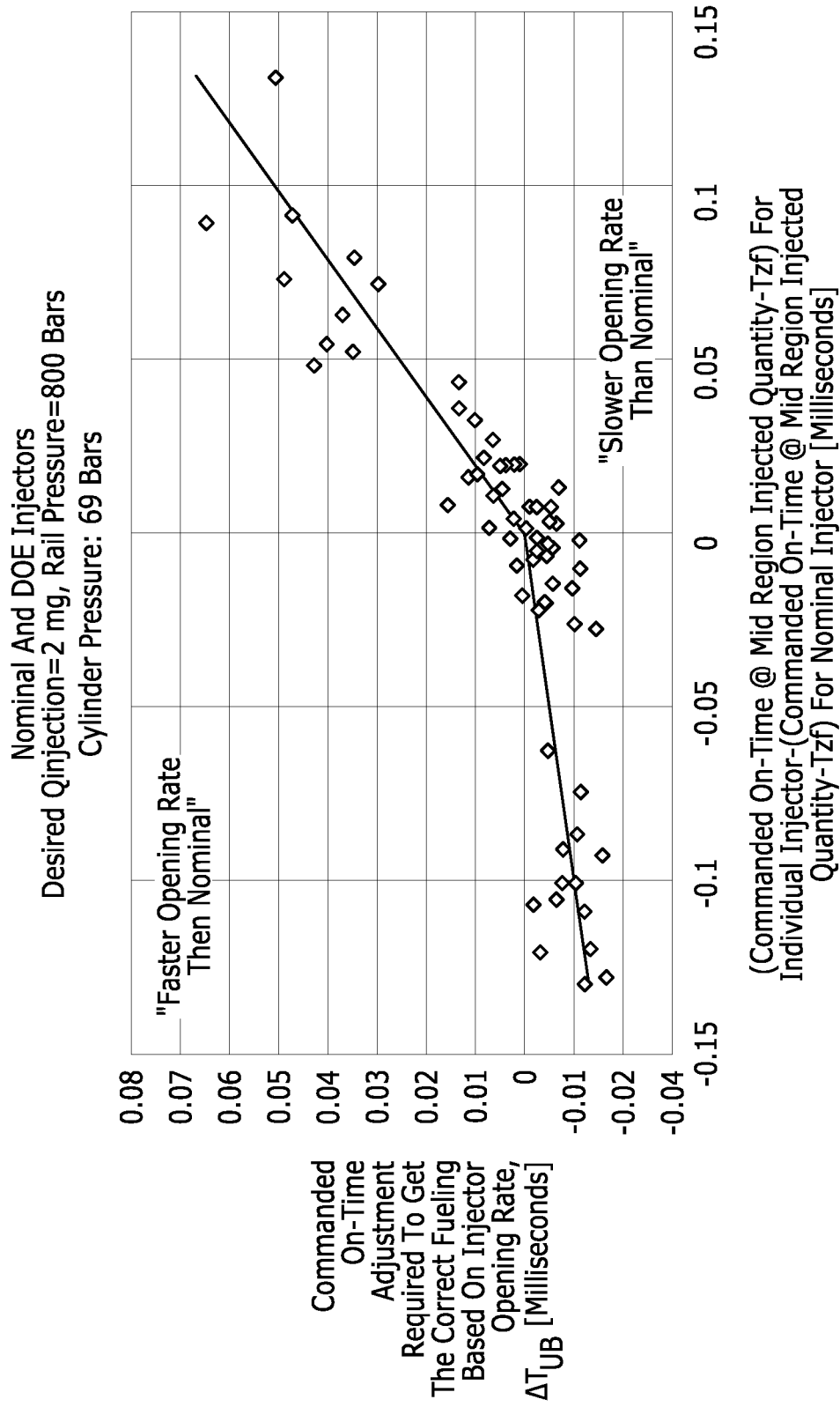
Figure 17D:
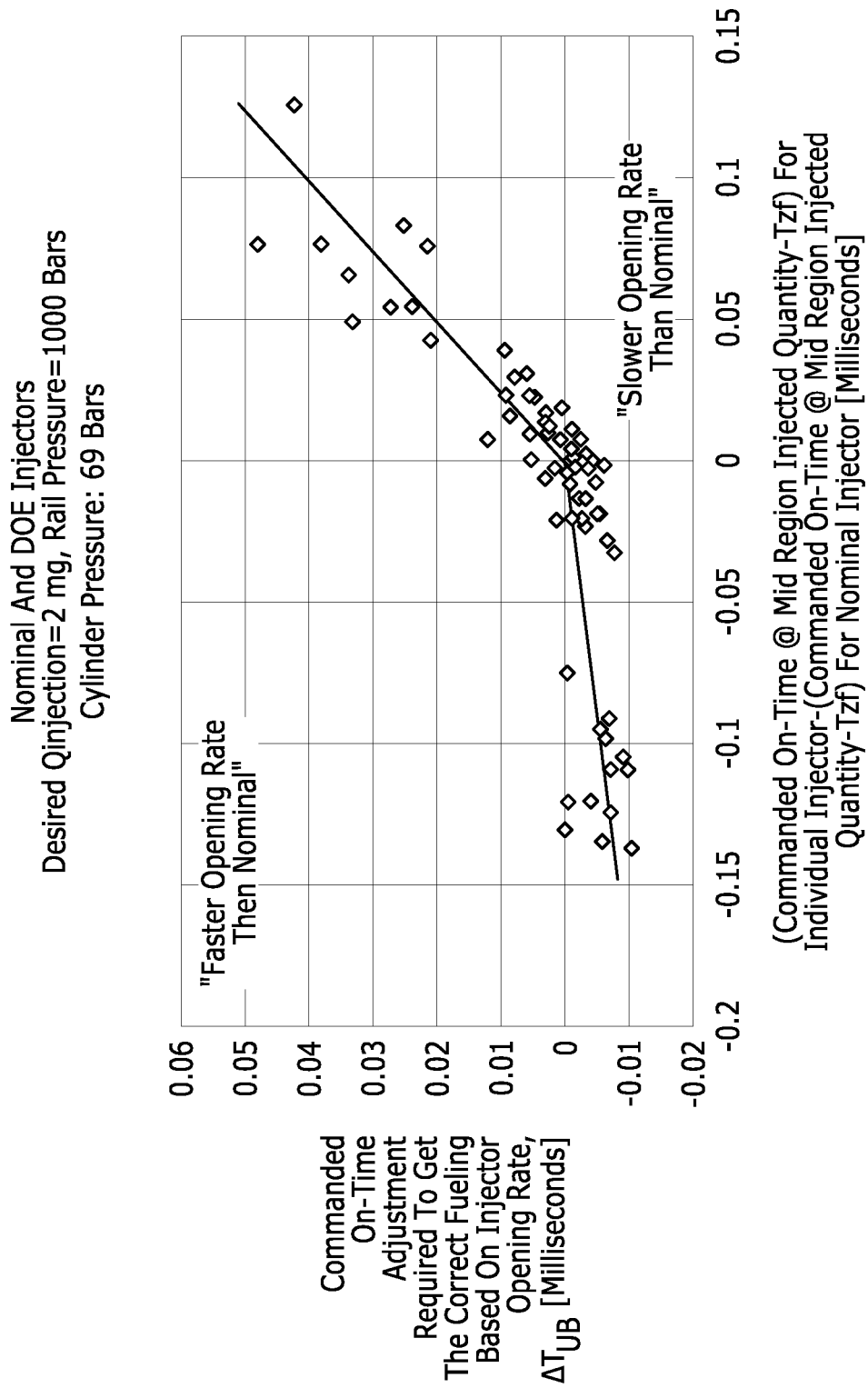
Figure 17E:
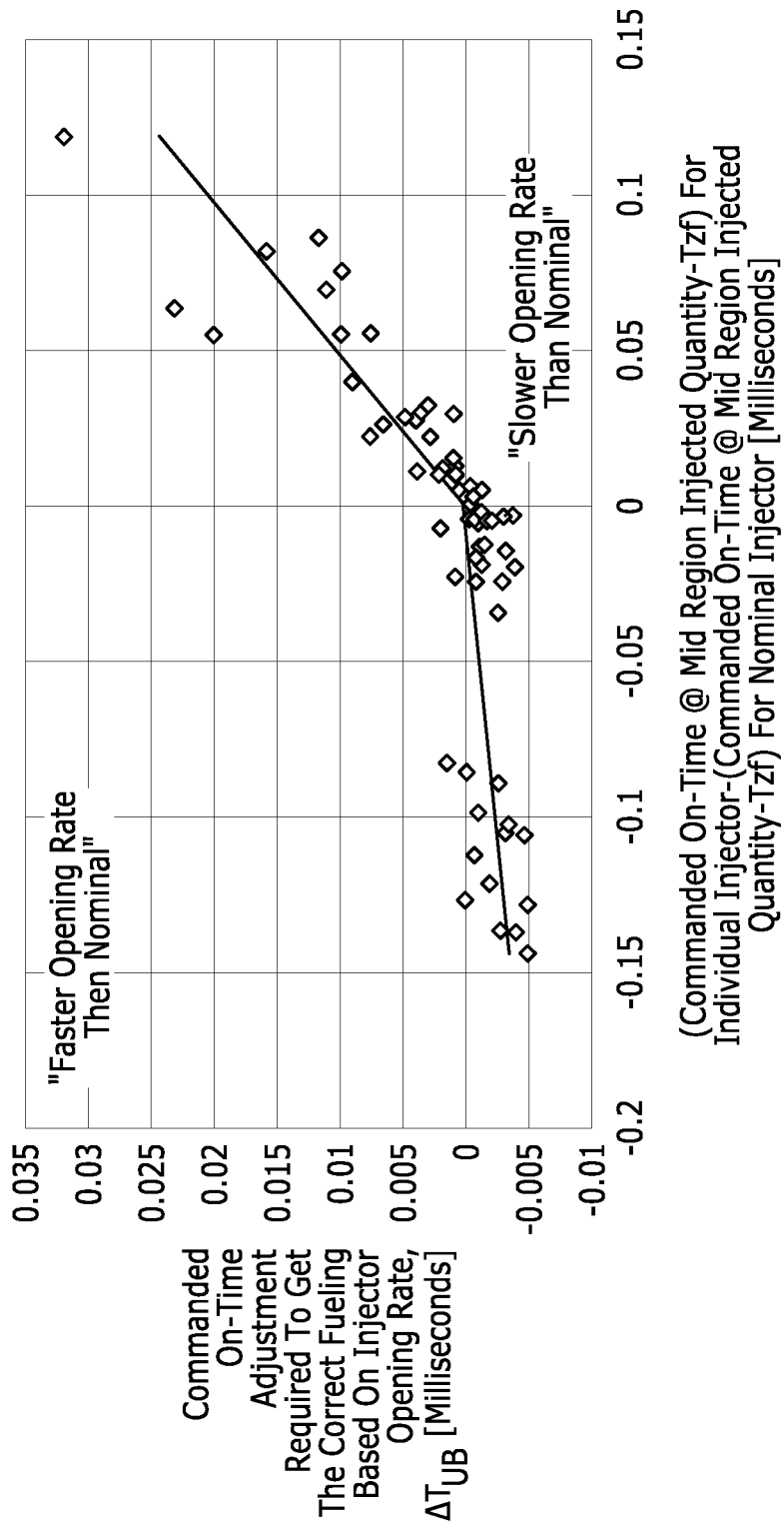
Figure 17F:
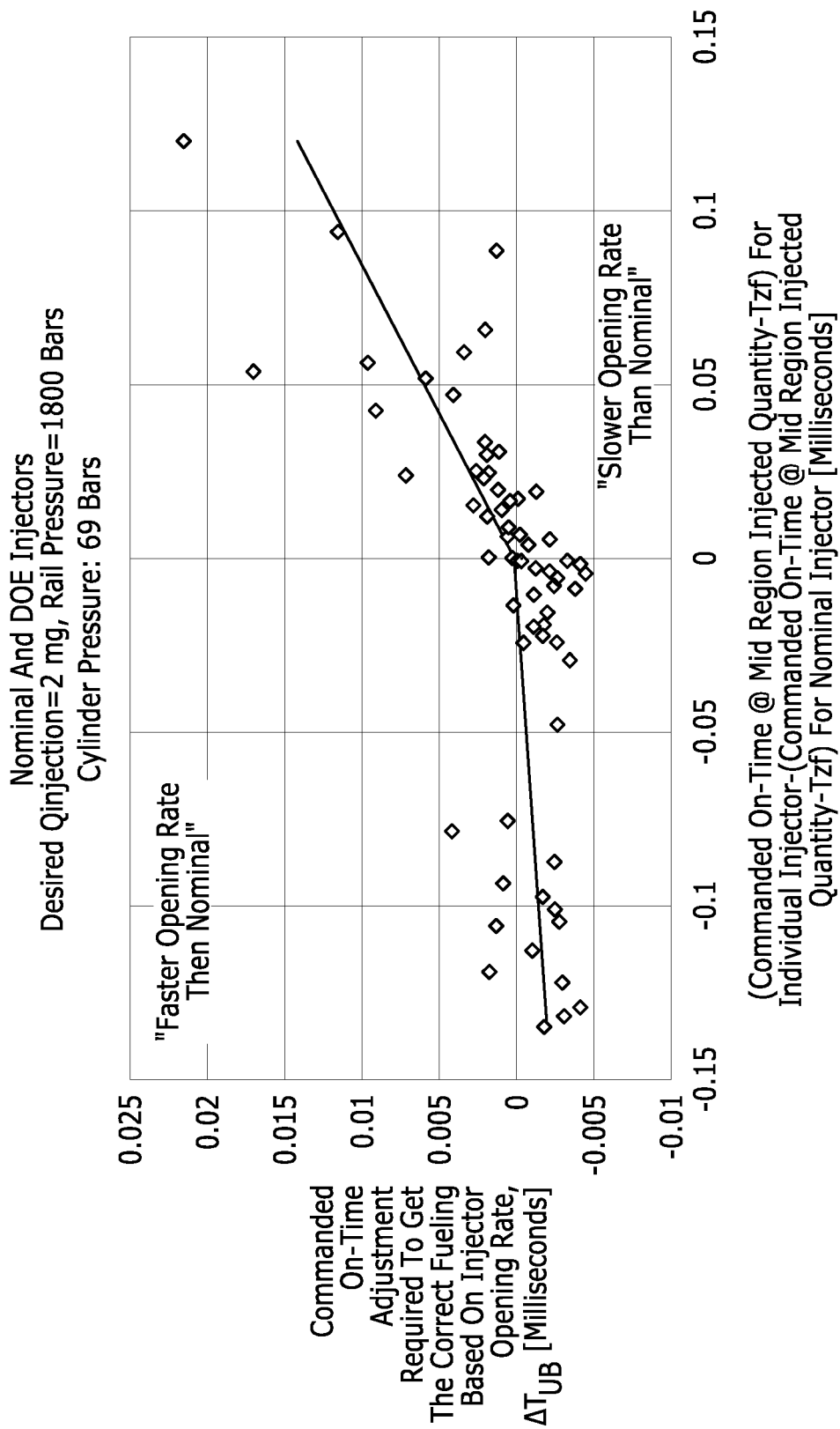

As graphical examples, FIG. 15A illustrates ΔTbf_nominal values at three rail pressures of the pressure vector (300, 600 and 1400 bars) for a nominal injector. FIG. 15B illustrates ΔTbf_individual values at the same three rail pressures P for an exemplary fast opening injector 30, where the ΔTbf_individual values are less than ΔTbf_nominal. FIG. 15C illustrates ΔTbf_individual values at the same three rail pressures P for an exemplary slow opening injector 30, where the ΔTbf_individual values are greater than ΔTbf_nominal. In connection with FIGS. 15A-15C, FIG. 16 is a graph illustrating certain low injected fuel quantities (e.g., 15-35 mg) in a lower ballistic operating region as a function of rail pressure for a representative injector 30.

In embodiments, the fixed and non-adapting Clb values are calculated during rig testing using nominal design of experiments (DOE) injectors that provide the relationships between the virtual sensor ΔTb values and the low quantity region response ΔTlb. FIGS. 17A-17F are graphical examples of a number of different Clb values.

Figure 18:
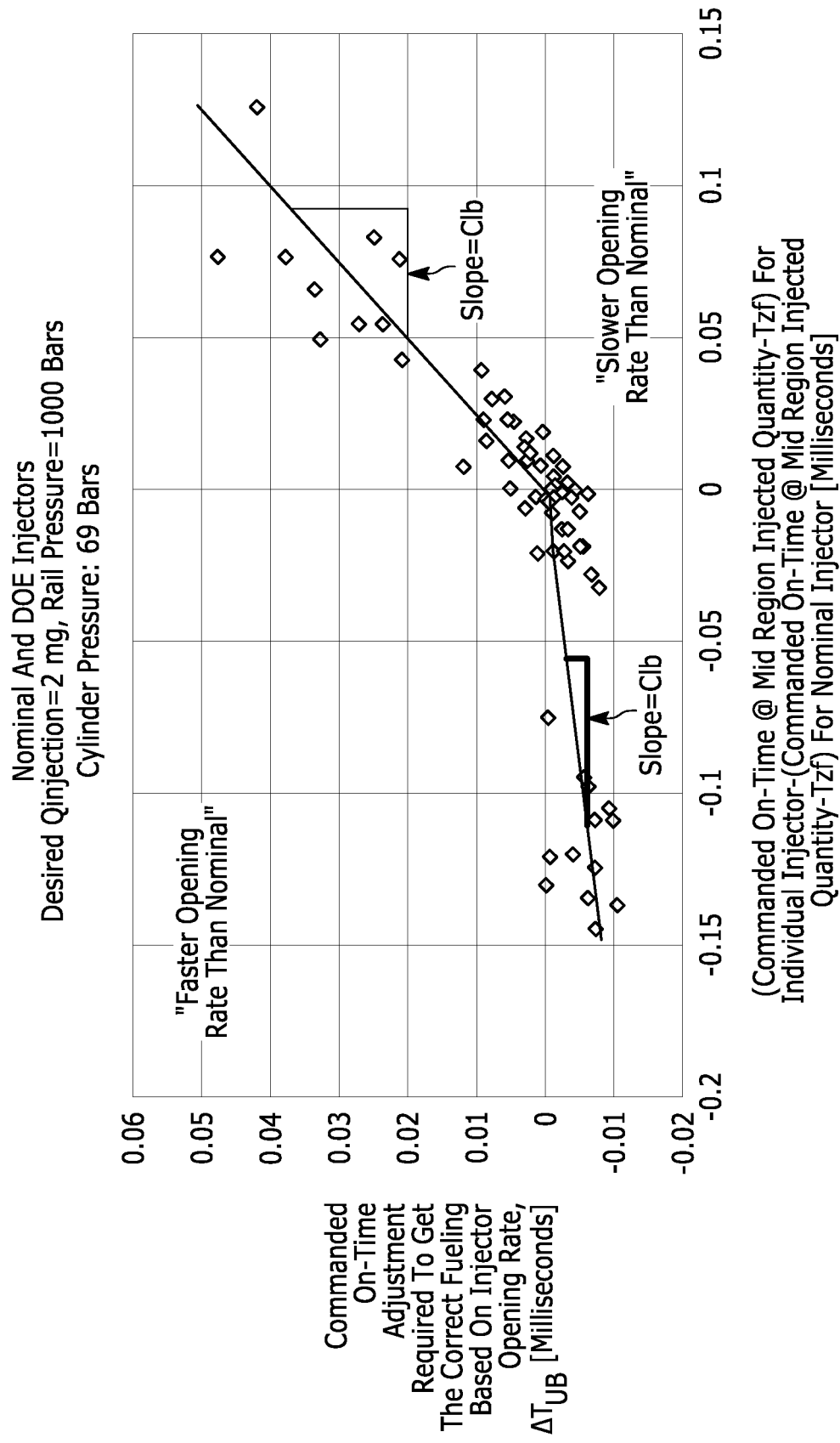
FIG. 18 is a graph illustrating slopes of the relationships between commanded on time adjustments and commanded on time for nominal and design of experiments injectors at a rail pressure, of certain injectors.
Figure 19:
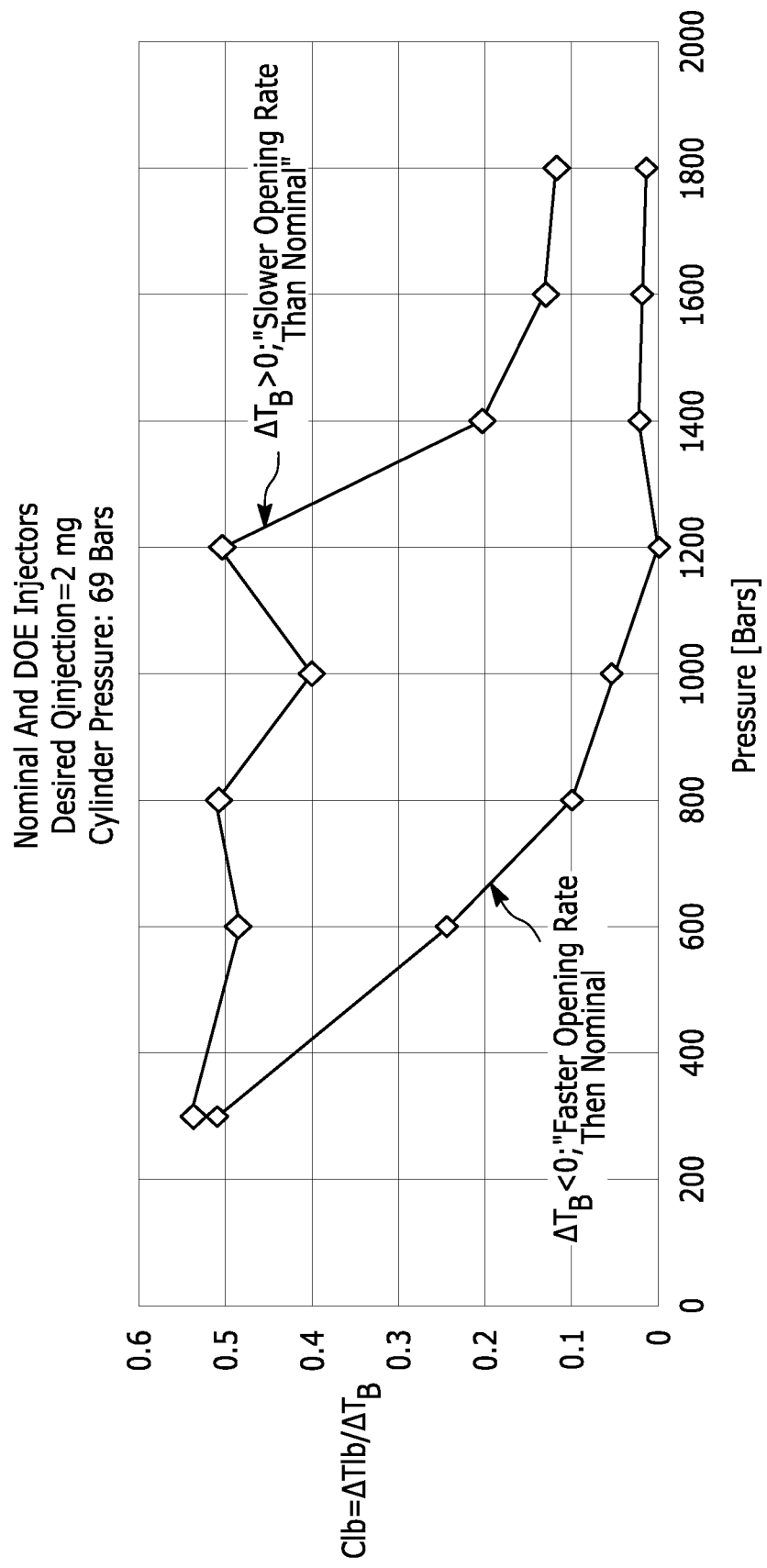
FIG. 19 is a graph illustrating slopes such as those of FIG. 18 based on rail pressures, of certain injectors.

The fixed, non-adapting calibration values of Clb may be calculated on-rig using nominal and DOE injectors corresponding to injector 30 which provide the relationship between the virtual sensor ΔTb and the low ballistic region response ΔTlb as shown in the FIG. 19 graph at a pressure of 1000 Bars. As is shown in the graph of FIG. 19, for the nominal and DOE injectors, the relationship between ΔTb and ΔTlb and is dependent on the pressure and is non-linear. As shown by the graph of FIG. 18, a piecewise linear relationship of the slope of ΔTlb as function of ΔTb was selected to represent Clb, with a differing slope values for when ΔTb>0 for "a slower opening rate than nominal" than when ΔTb<0 for "a faster opening rate than nominal". If desired, in embodiments the values of Clb may be reduced in magnitude relative to the test rig-developed optimal values which maximize or optimize both the accuracy and precision of the low injected quantity and reduce the adapted response sensitivity to errors in ΔTb. Maximum absolute values of ΔTb may also be set by control system 20. Clb is generally smaller in magnitude for faster opening injectors as the opening slope of the injector in the ultra-low fueling is generally relatively steep for the nominal injector. Step 624 of the method 600 illustrated in FIG. 6 describes the calculation of Clb values. Step 626 describes the calculation of ΔTlb values.

Figure 20:
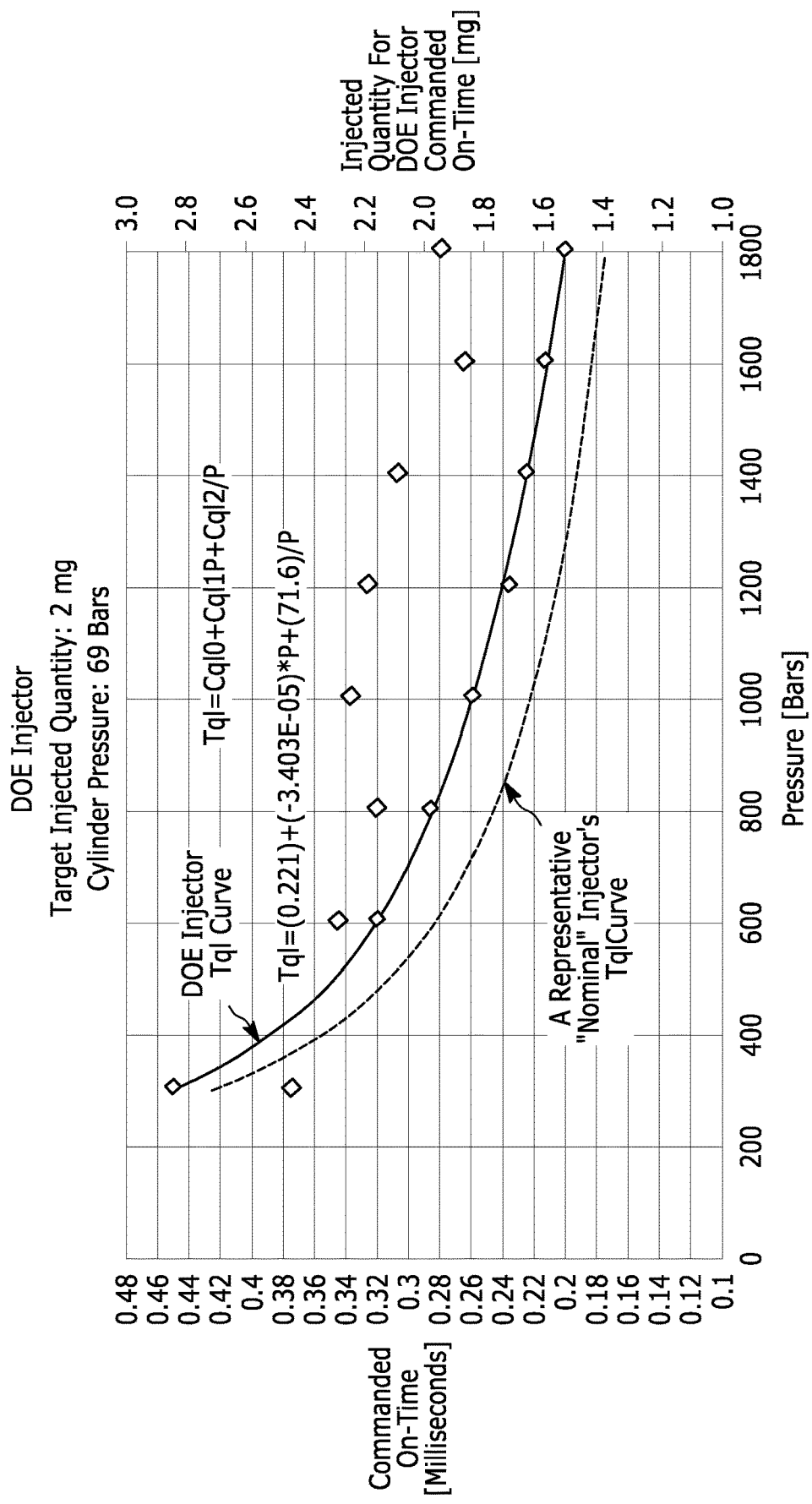
FIG. 20 is a graph illustrating commanded on times based on rail pressures for a target injection pulse quantity for certain injectors, in accordance with embodiments.
Figure 21:
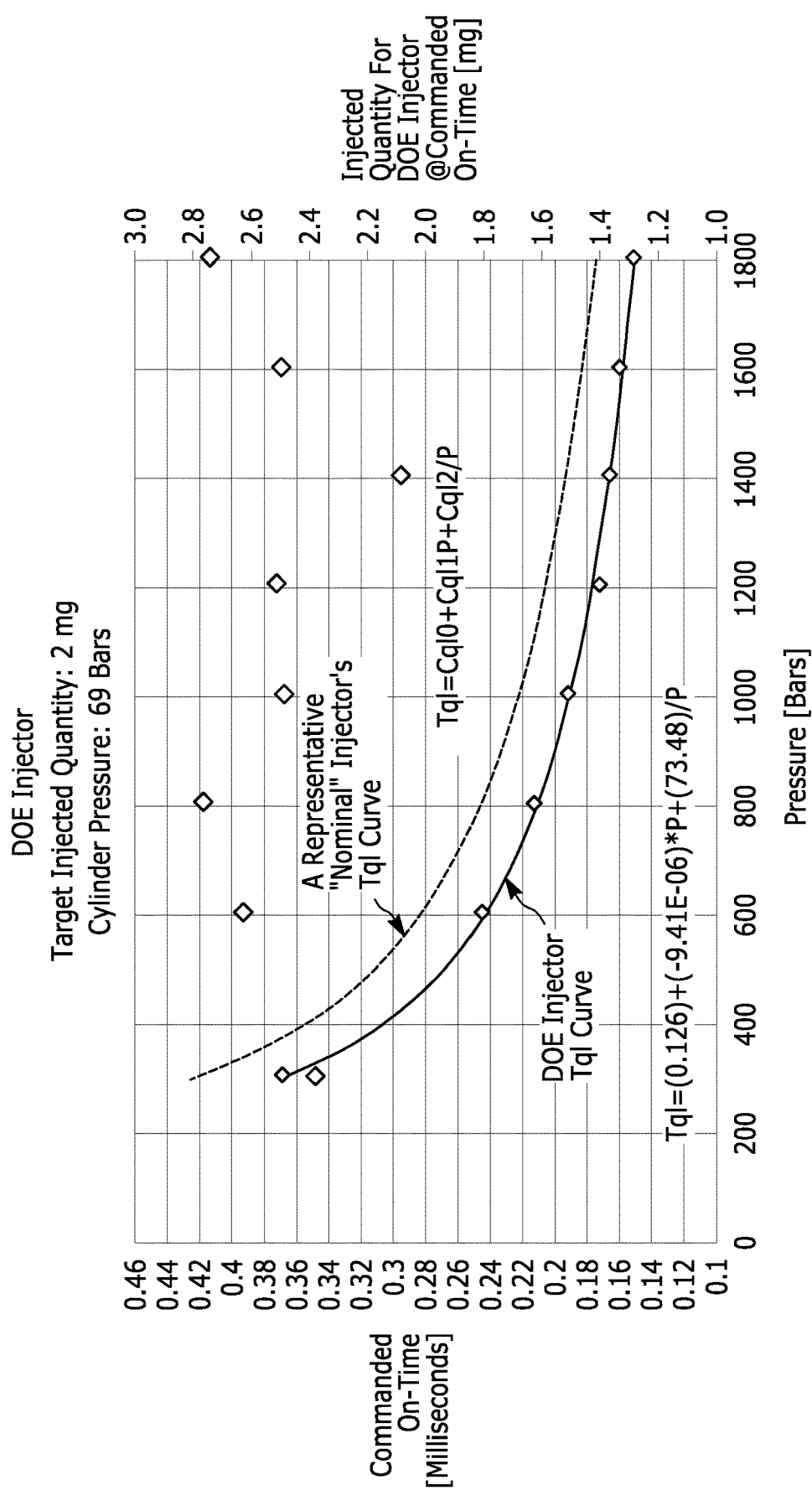
FIG. 21 is a graph illustrating commanded on times based on rail pressures for a target injection pulse quantity for certain injectors, in accordance with embodiments.

The Tql response functions based on the rail pressure P are calculated using the individually calculated Tql values for each rail pressure P in the pressure vector using Eq. 4 in embodiments. Accuracy of the method 600 for two relatively open loop extreme design of experiments injectors is shown in the graphs of FIGS. 20 and 21. The DOE injector represented in FIG. 20 required a significantly longer commanded on-time to deliver the targeted 2 mg of injected quantity than a nominal injector. The DOE injector represented in FIG. 21 required a significantly shorter commanded on-time to deliver the targeted 2 mg of injected quantity than a nominal injector. This relatively extreme DOE injector had a relatively high injected quantity error at 2 mg of any of a group of forty-eight DOE injectors which were built as 6+ Sigma examples for development and testing purposes.

ΔPcyl Cylinder Pressure Compensation

Figure 22:
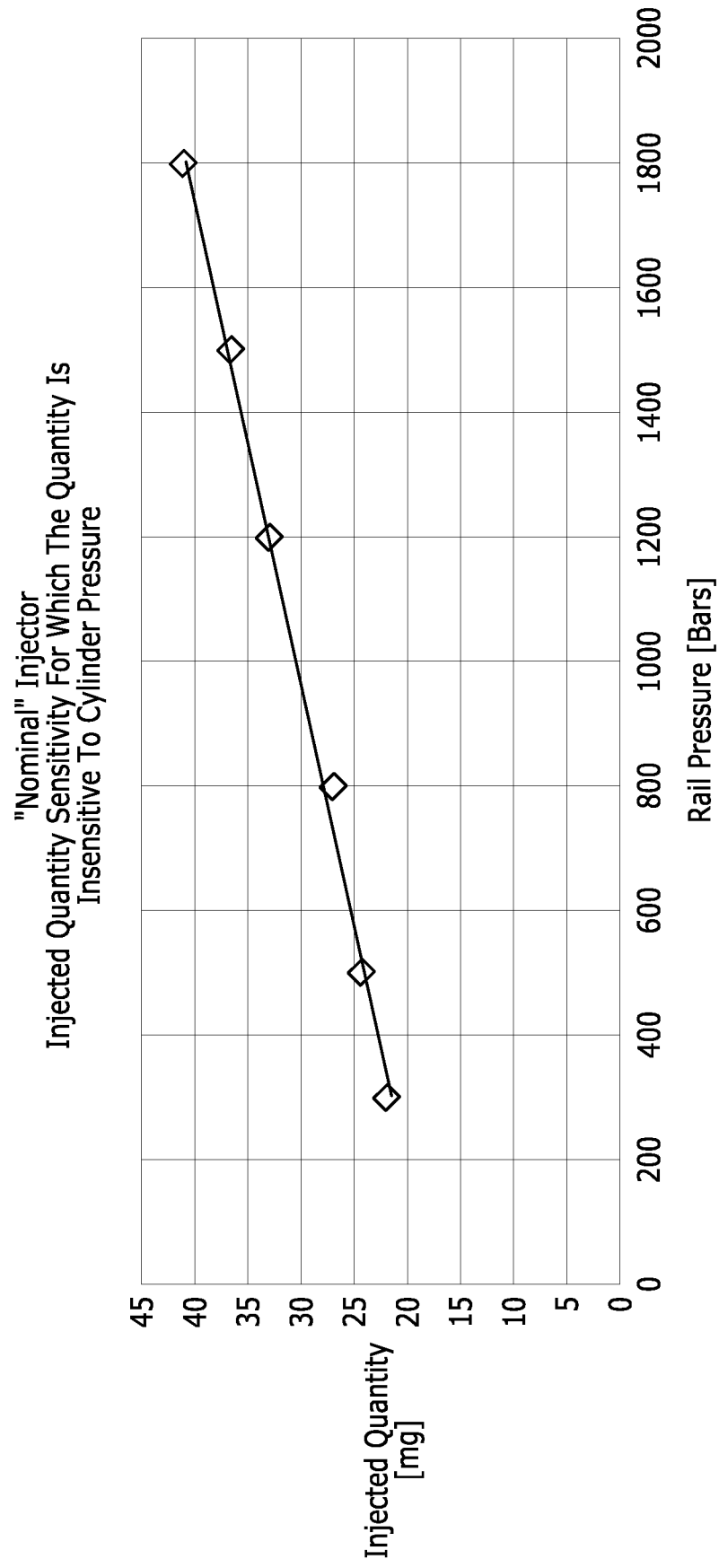
FIG. 22 is a graph illustrating injected fuel pulse quantities based on rail pressures for a nominal injector.
Figure 23:
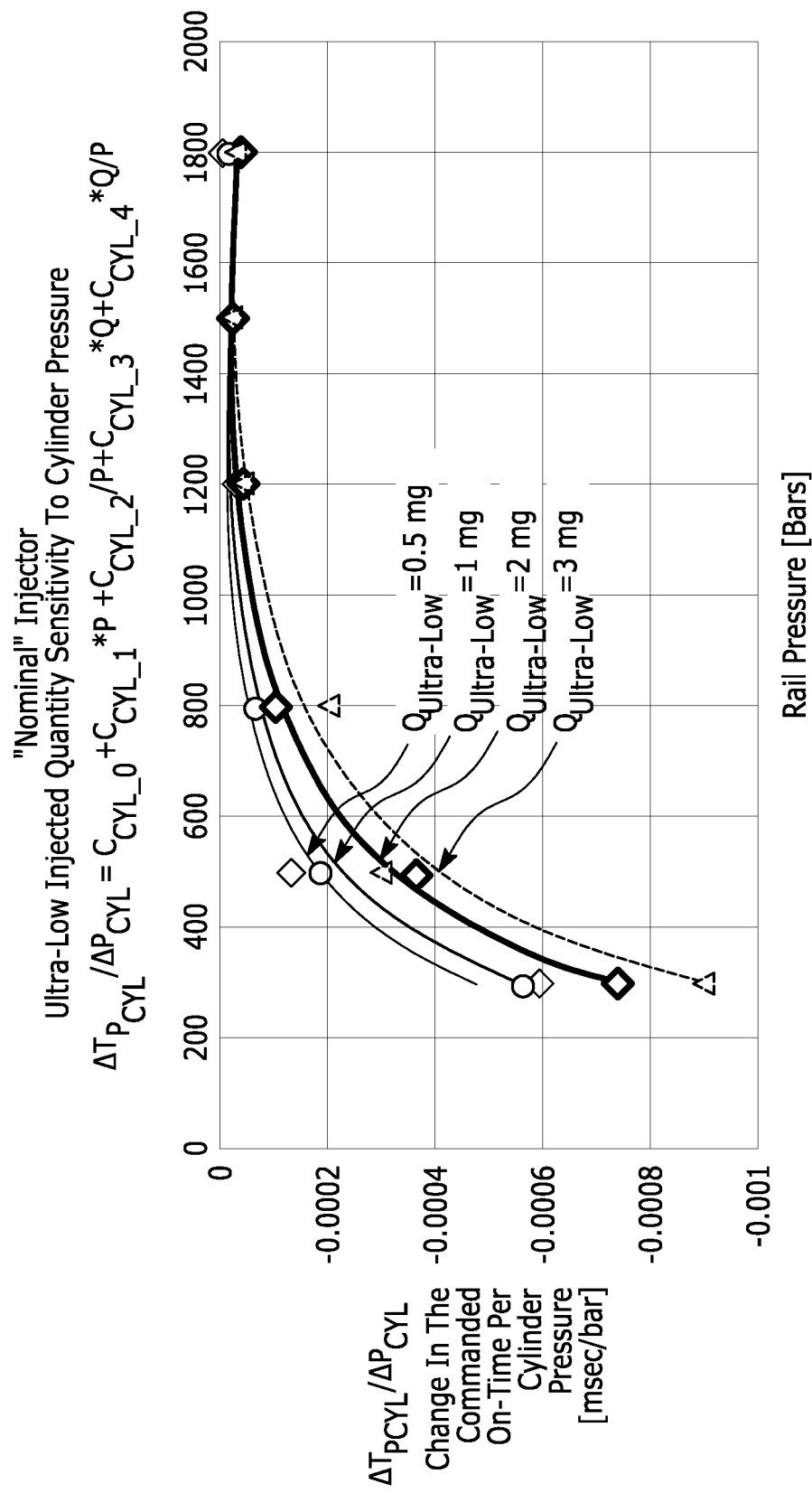
FIG. 23 is a graph illustrating cylinder pressure-related changes in commanded on time as a function of rail pressures for a nominal injector at a number of different injection pulse quantities.

As described above in connection with Eq. 5 (FIG. 5A), embodiments of control system 20 generate injection pulse control signals based on the cylinder pressure Pcyl of the cylinder into which the associated injection fuel pulse is to be delivered. In the low injection quantity region, increasing the cylinder pressure increases the injection quantity as a dominate effect is the increased net cylinder pressure force acting on the tip area of the lower plunger below the plunger and nozzle sealing region which acts to produce an earlier start of injection. For certain injectors, the injected fuel quantity, which is insensitive to the cylinder pressure, is shown in the graph of FIG. 22. At higher injection quantities, increasing the cylinder pressure has a net effect of reducing the injected quantity as a result of the reduced net pressure differential which drives the injection flow rate. In the low (e.g., ultra-low) region, the change in the commanded on-time for an injector 30 can be modeled using Eq. 25 in FIG. 5D. The coefficients Ccyl0, Ccyl1, Ccyl2, Ccyl3 and Ccyl4 may be non-adapting and determined from rig testing results. The change in commanded on-time to account for the cylinder pressure ΔPcyl and the low injected quantity Q may be estimated using Eq. 6 in FIG. 5A. The net resulting commanded on-time which, can be used in the low (e.g., ultra-low) fueling region includes the five terms which are summed in the calculation as shown in Eq. 5 in FIG. 5A. Step 630 of the method 600 illustrated in FIG. 6 describes the calculation of ΔPcyl values. Step 632 describes the calculation of the Tql values.

Exemplary Control System Hardware

Many aspects of the disclosure are described in terms of sequences of actions to be performed by elements of a computer system or other hardware capable of executing programmed instructions, for example, a general purpose computer, special purpose computer, workstation, or other programmable data processing apparatus. It will be recognized that in each of the embodiments, the various actions could be performed by specialized circuits (e.g., discrete logic gates interconnected to perform a specialized function), by program instructions, such as logical blocks, program modules etc. being executed by one or more processors (e.g., one or more microprocessor, a central processing unit (CPU), and/or application specific integrated circuit), or by a combination of both. For example, embodiments can be implemented in hardware, firmware, middleware, microcode, or any combination thereof. The instructions can be program code or code segments that perform necessary tasks and can be stored in a non-transitory machine-readable medium such as a storage medium or other storage(s). A code segment may represent a procedure, a function, a subprogram, a program, a routine, a subroutine, a module, a package, a class, or any combination of instructions, data structures, or program statements. A code segment may be coupled to another code segment or a hardware circuit by passing and/or receiving information, data, arguments, parameters, or memory contents.

The non-transitory machine-readable medium can additionally be considered to be embodied within any tangible form of computer readable carrier, such as solid-state memory, magnetic disk, and optical disk containing an appropriate set of computer instructions, such as program modules, and data structures that would cause a processor to carry out the techniques described herein. A computer-readable medium may include the following: an electrical connection having one or more wires, magnetic disk storage, magnetic cassettes, magnetic tape or other magnetic storage devices, a portable computer diskette, a random access memory (RAM), a read-only memory (ROM), an erasable programmable read-only memory (e.g., EPROM, EEPROM, or Flash memory), or any other tangible medium capable of storing information.

It should be noted that the system of the present disclosure is illustrated and discussed herein as having various modules and units which perform particular functions. It should be understood that these modules and units are merely schematically illustrated based on their function for clarity purposes, and do not necessarily represent specific embodiments. In this regard, these modules, units and other components may be implemented to substantially perform their particular functions explained herein. The various functions of the different components can be combined or segregated as modules in any manner, and can be useful separately or in combination. Input/output or I/O devices or user interfaces including but not limited to keyboards, displays, pointing devices, and the like can be coupled to the system either directly or through intervening I/O controllers. Thus, the various aspects of the disclosure may be embodied in many different forms, and all such forms are contemplated to be within the scope of the disclosure.

SUMMARY

The methods described herein can be used for determining the on-engine, closed loop commanded on-times at a range of fuel pulse quantities, and is especially useful in connection with low or ultra-low injection quantities. Accuracy of the method based on test results is approximately: (End of Life Injectors: 1±0.53 mg and 2±0.69 mg). The method is engine emissions non-intrusive as it requires no unique injection producing pulses. The method provides a commanded on-time in the low and ultra-low injection quantity region. The method provides an estimate of the slope of the injected quantity in the low and ultra-low injection quantity region. Since the method provides both the commanded on-time and slope in the low and ultra-low region, need for the low fueling region response surface to address both the ultra-low and low fueling region may not be needed in embodiments. The commanded on-time and slope in the low and ultra-low region provides a foundation for the low fueling curve. The low and ultra-low fueling quantities can be selected to improve the pilot quantity for the pilot to main interaction algorithm. The method is computationally relatively simple and can be efficiently implemented. The method can provide extremely fast feedback on commanded on-time changes related to the low and ultra-low quantity which can be used in algorithms such as on board diagnostics (OBD) prognostication, fault detection, and service purposes. The method is robust to most noise sources such as pilot valve drain pressure. The method is relatively easy to calibrate and can efficiently done based on rig testing results. In instances where on-engine testing reveals bias in the low or ultra-low injected quantity, the method has the capability to efficiently and effectively address the offset.

The method largely uses linear equations, minimizing the need for complex processing steps in algorithms. The method largely utilizes open loop control structures which have fixed coefficients which can be easily be calibrated on rig rather than on-engine. The method is not intrusive with respect to engine emissions. There is no injection during the on-engine data collection process and the likelihood of unintended injection is low. Data collection can take place even when the engine is producing power with another injector. The method enables fast on-engine adaption which can enable fast detection of "failed" injectors for purposes including on board diagnostics. The method can be used to account for noise sources such as the instantaneous cylinder pressure during the small quantity injection event. The method significantly reduces the probability of obtaining a non-injection pulse when a non-zero injection pulse is commanded. The operating environment of the injector pilot valve within the valve cover of the engine acts to improve the robustness of the pilot valve's drain quantity to many noise sources.

It is to be understood that the above description is intended to be illustrative, and not restrictive. Many other embodiments will be apparent to those of skill in the art upon reading and understanding the above description. For example, it is contemplated that features described in association with one embodiment are optionally employed in addition or as an alternative to features described in or associated with another embodiment. The scope of the invention should, therefore, be determined with reference to the appended claims, along with the full scope of equivalents to which such claims are entitled.

The invention claimed is:

1. A method for operating a fuel-injected engine, comprising:
periodically operating one or more fuel injectors of the engine in a non-injection state;
generating and storing parameter information representative of the operation of the one or more fuel injectors in the non-injection state;
operating the one or more fuel injectors in an injection state to inject a desired pulse of fuel based upon the parameter information and information representative of an additional amount of fuel.

2. The method of claim 1 wherein:
operating the one or more fuel injectors in the non-injection state includes periodically operating the injectors at a plurality of rail pressures;
generating and storing the parameter information includes generating and storing the parameter information at each of the plurality of rail pressures; and
operating the one or more fuel injectors in the injection state includes causing the injector to inject the desired pulse of fuel based upon the parameter information and rail pressure.

3. The method of claim 1 wherein generating and storing parameter information includes generating and storing information representative of pilot fuel flow in a non-operational or non-injection state.

4. The method of claim 3 wherein:
generating and storing parameter information includes generating and storing information representative of a threshold on time when the fuel injector transitions from the non-injection state to the injection state; and
operating the one or more fuel injectors in the injection state includes causing the injector to inject the desired pulse of fuel based upon the threshold on time.

5. The method of claim 4 wherein operating the one or more fuel injectors in the injection state includes causing the fuel injector to inject the desired pulse of fuel based upon the parameter information and stored nominal injector information representative of operation of a nominal fuel injector in a non-injection state.

6. The method of claim 1 wherein operating the one or more fuel injectors in the injection state includes causing the fuel injector to inject a desired pulse of fuel based upon the parameter information and stored nominal injector information representative of operation of a nominal fuel injector in a non-injection state.

7. The method of claim 6 wherein:
the parameter information is information representative of a threshold on time when the fuel injector transitions from the non-injection state to the injection state; and
the stored nominal injector information is representative of the nominal injector threshold on time when the nominal injector transitions from the non-injection state to an injection state.

8. The method of claim 6 wherein:
generating and storing information representative of the operation in the one or more fuel injectors of the engine in the non-injection state includes generating and storing information representative of a drain flow of the injector in the non-injection state; and
the stored nominal injector information includes information representative of a drain flow of the nominal injector in the non-injection state.

9. The method of claim 1 wherein the information representative of the additional amount of fuel includes the parameter information.

10. The method of claim 9 wherein the information representative of the additional amount of fuel includes information representative of operation of the one or more fuel injectors of the engine in the injection state.

11. The method of claim 10 wherein the information representative of the additional amount of fuel includes information representative of operation of the one or more fuel injectors of the engine in a ballistic region of the injection state.

12. Method of claim 9 wherein the information representative of the additional amount of fuel includes stored nominal injector information representative of operation of a nominal injector in an injection state.

13. The method of claim 12 wherein the stored nominal injector information includes information representative of the operation of the nominal injector in a ballistic region of the injection state.

14. The method of claim 1 wherein the information representative of the additional amount of time includes information defining a relationship between a nominal injector opening time and an actual opening time of a plurality of design of experiment fuel injectors.

15. The method of claim 1 wherein the desired pulse of fuel is a relatively low quantity pulse of fuel, optionally a quantity within a ballistic opening region of the fuel injector, or optionally within a lower one-half of the ballistic opening region of the fuel injector.

16. The method of claim 1 wherein:
generating and storing parameter information includes generating and storing parameter information representative of the operation of the one or more fuel injectors in an injection state at a plurality of cylinder pressures; and
operating the one or more fuel injectors to inject a desired pulse of fuel includes causing the injector to inject the desired pulse of fuel based upon the parameter information and cylinder pressure.

* * * * *